United States Patent [19]

Iwaki et al.

[11] Patent Number: 5,173,809
[45] Date of Patent: Dec. 22, 1992

[54] OBJECTIVE LENS SYSTEM OF OPTICAL INFORMATION RECORDING/REPRODUCING APPARATUS

[75] Inventors: Makoto Iwaki; Koichi Maruyama, both of Tokyo, Japan

[73] Assignee: Asahi Kogaku Kogyo Kabushiki Kaisha, Tokyo, Japan

[21] Appl. No.: 769,764

[22] Filed: Oct. 4, 1991

Related U.S. Application Data

[63] Continuation of Ser. No. 486,600, Feb. 28, 1990, abandoned.

[30] Foreign Application Priority Data

Feb. 28, 1989 [JP] Japan ................................. 1-47589
Feb. 28, 1989 [JP] Japan ................................. 1-47590

[51] Int. Cl.⁵ .......................... G02B 13/18; G02B 9/12
[52] U.S. Cl. ........................................ 359/784; 359/708
[58] Field of Search .......................... 350/474–476, 350/479, 432, 469; 359/708, 716, 717, 785, 786, 795, 796, 784

[56] References Cited

U.S. PATENT DOCUMENTS 3,554,629  1/1971  Takahashi ........................... 359/356
4,743,093  5/1988  Oinen .................................. 350/432
4,753,524  6/1988  Sugiyama ............................ 350/480
4,765,723  8/1988  Takamura ........................... 350/432
4,909,616  3/1990  Arai .................................... 350/432
4,953,959  9/1990  Ishiwata et al. .................... 350/432

FOREIGN PATENT DOCUMENTS 58-72114   4/0983  Japan .
59-023313  5/1984  Japan .
61-177408  8/1986  Japan .
61-259215  11/1986 Japan .
62-35311   2/1987  Japan .
62-203112  9/1987  Japan .
62-269922  11/1987 Japan .
1-287519   2/1990  Japan .

Primary Examiner—Bruce Y. Arnold
Assistant Examiner—James Phan
Attorney, Agent, or Firm—Sandler, Greenblum & Bernstein

[57] ABSTRACT

An object lens system consists of a converging lens which has both surfaces formed of a convex aspherical surface and having a radius of curvature which is increased as it goes toward the periphery from the center thereof, and a chromatic aberration correcting element having almost no power disposed towards said light source side of said converging lens and adapted to correct a chromatic aberration of said converging lens.

20 Claims, 41 Drawing Sheets

FIG. 3
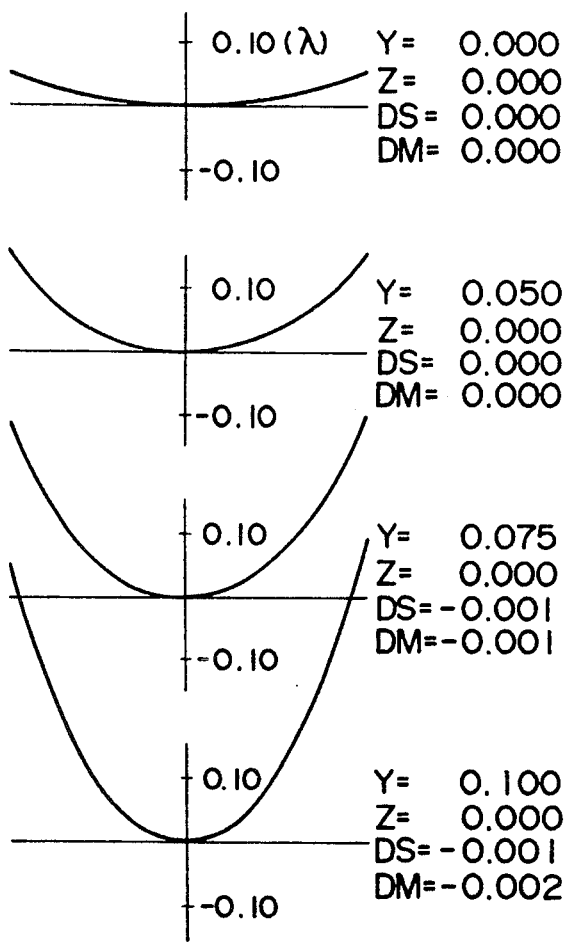
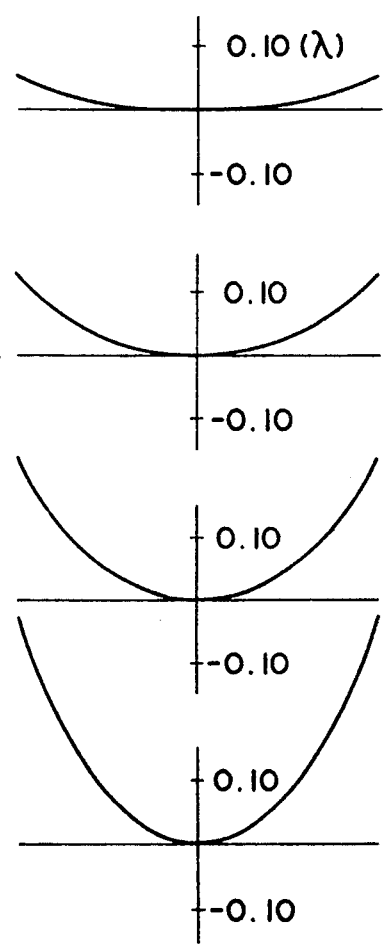

FIG. 7
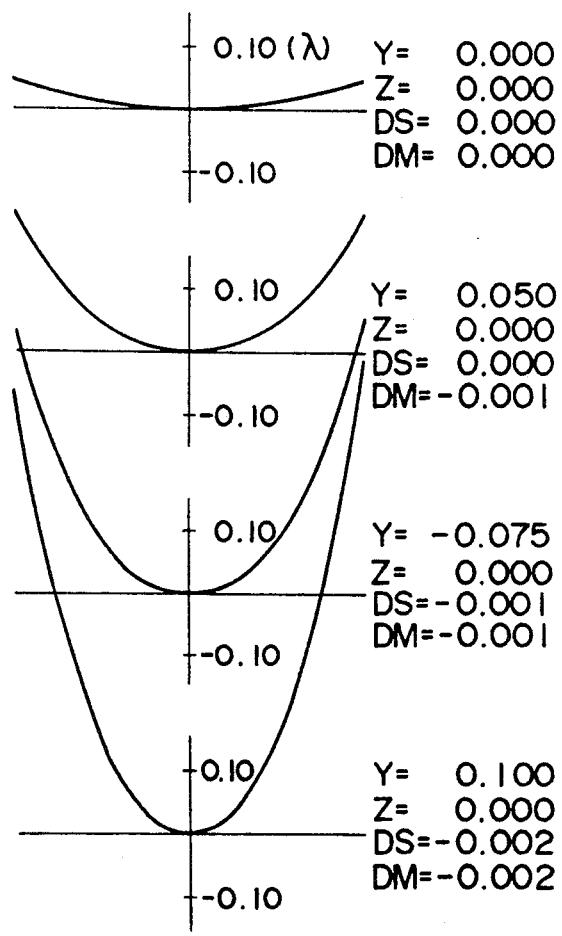
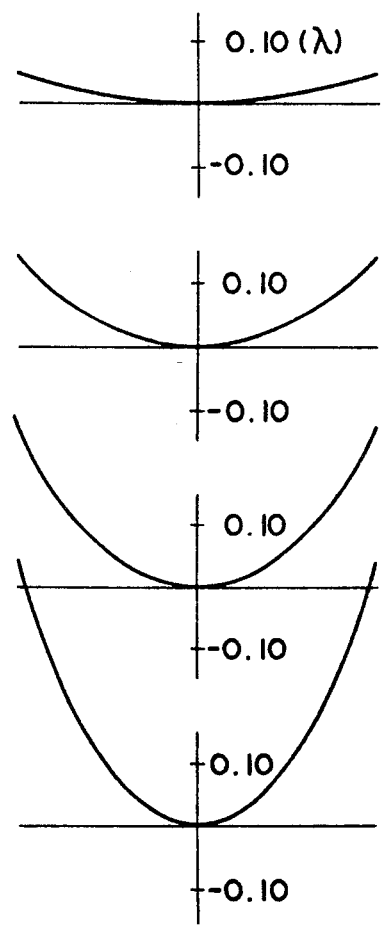

FIG. 10
MERIDIONAL
SAGITTAL
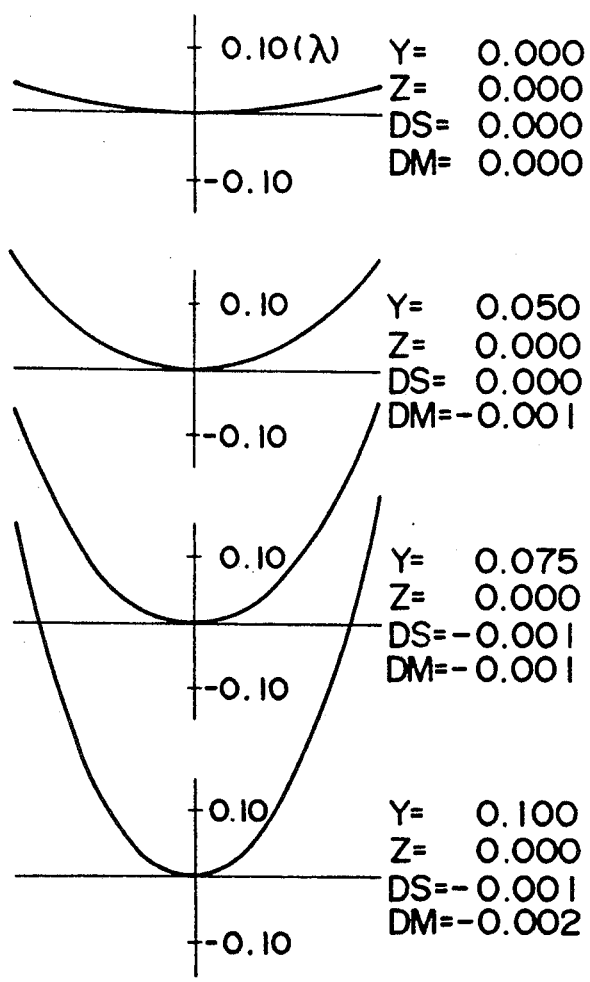
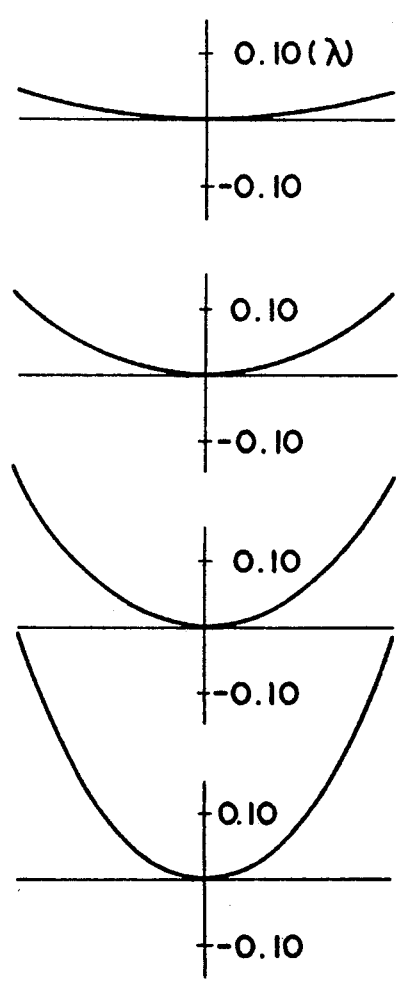

FIG. II

FIG. 13
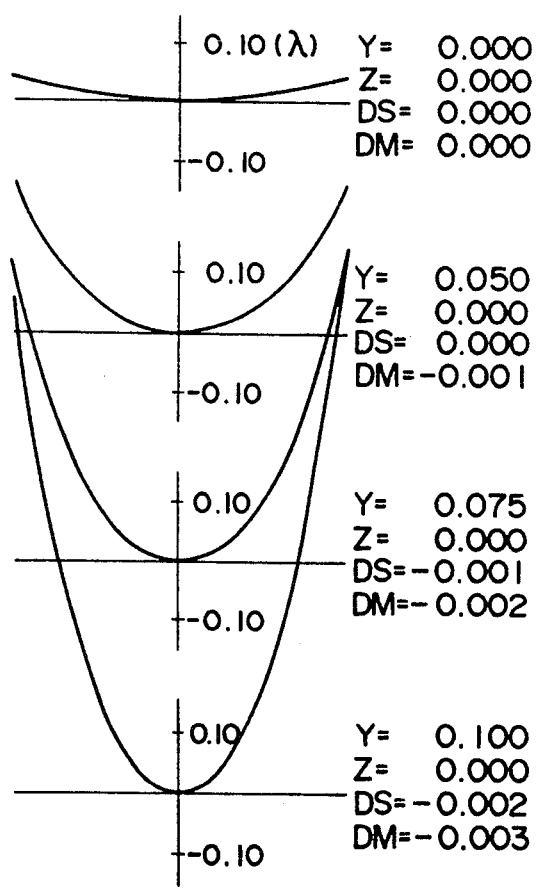
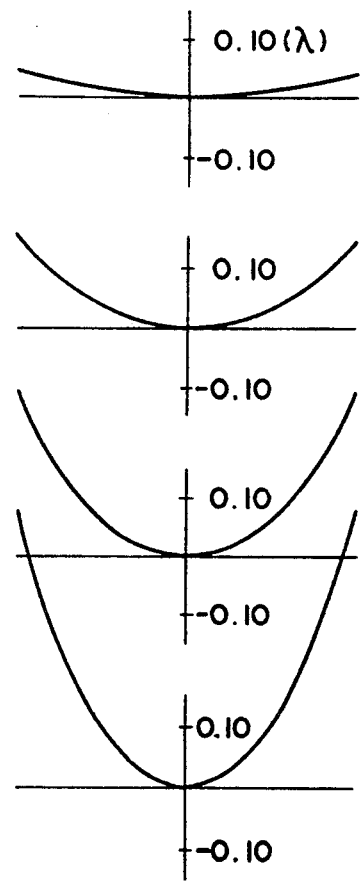

FIG. 16
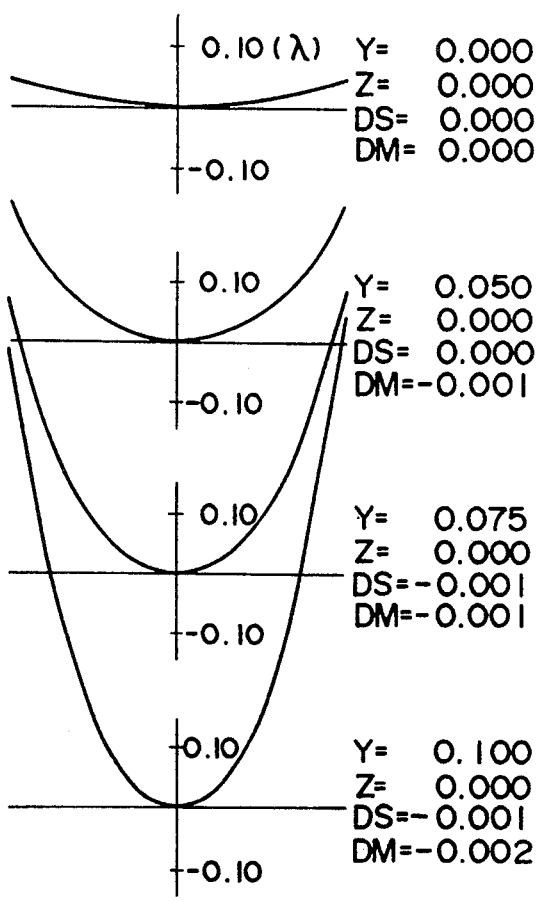
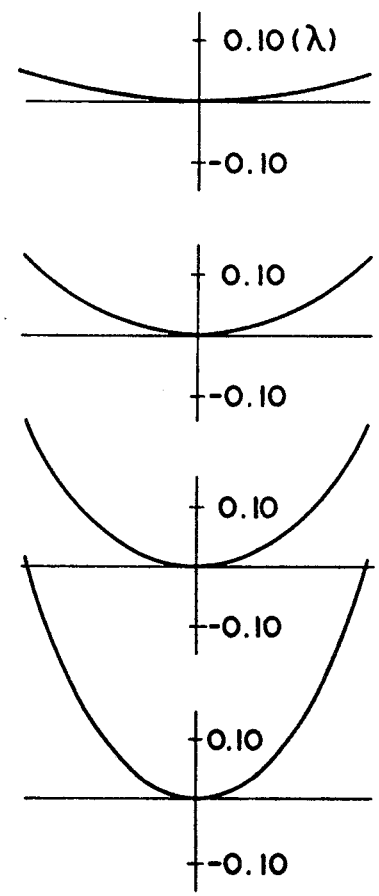

FIG. 19
MERIDIONAL
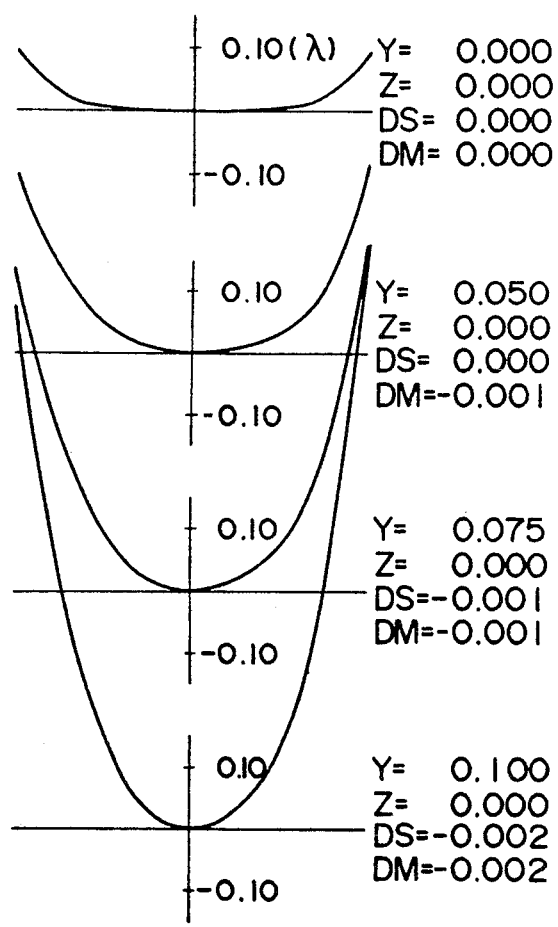
SAGITTAL
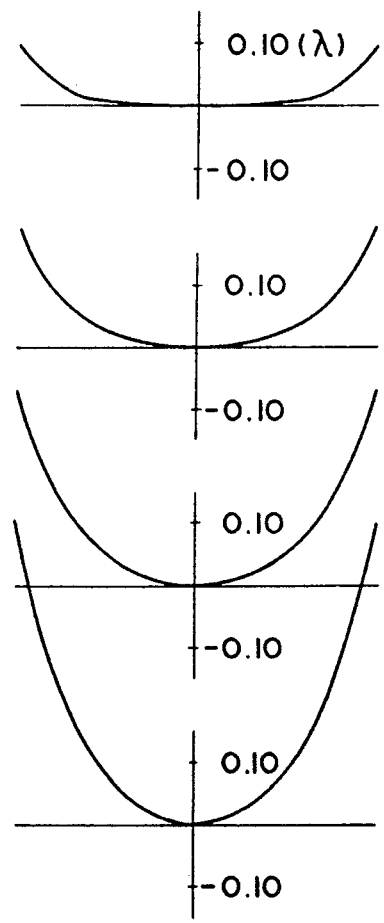

FIG.22
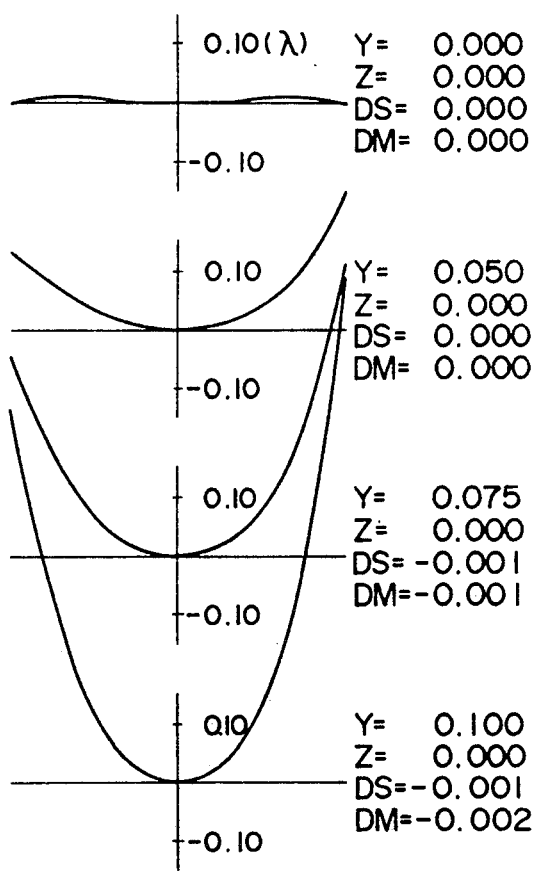
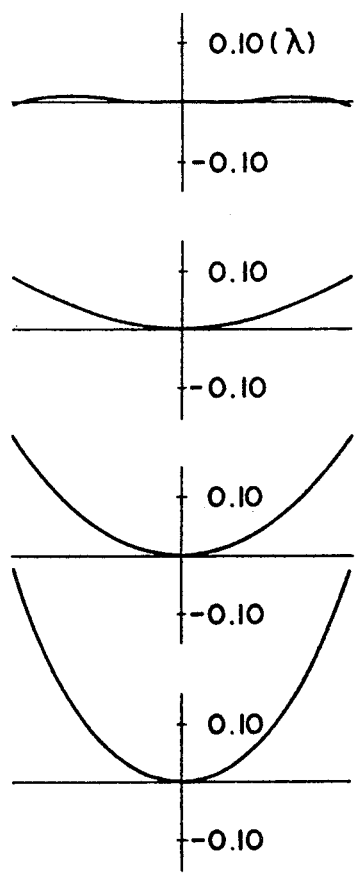

FIG. 24
MERIDIONAL
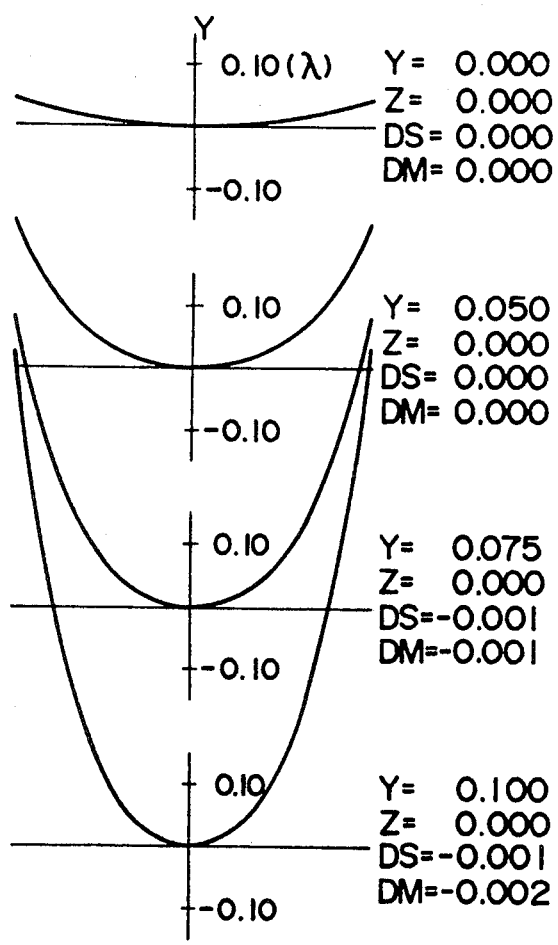
SAGITTAL
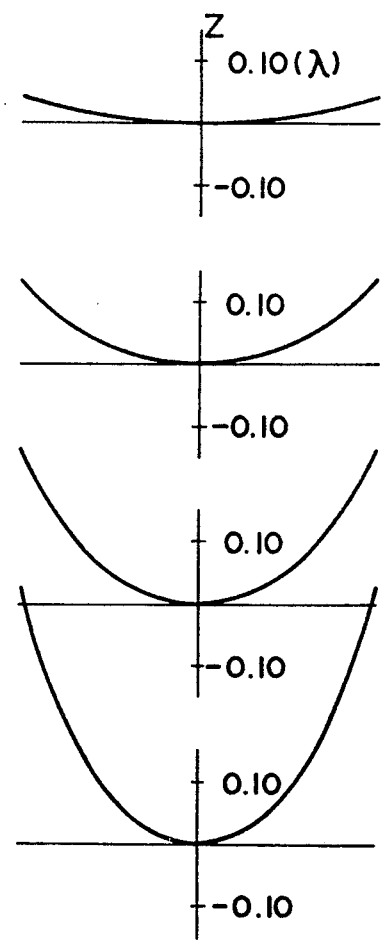

FIG. 27
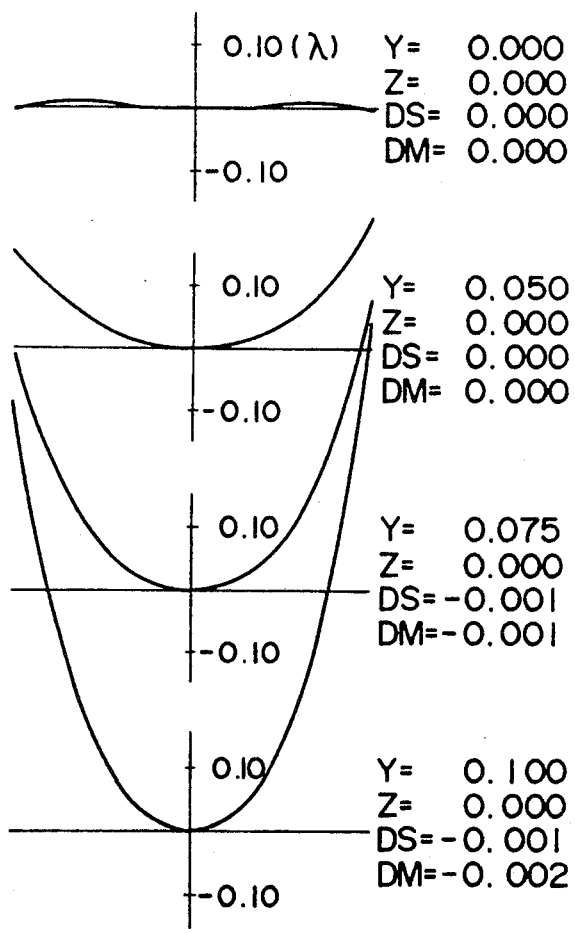
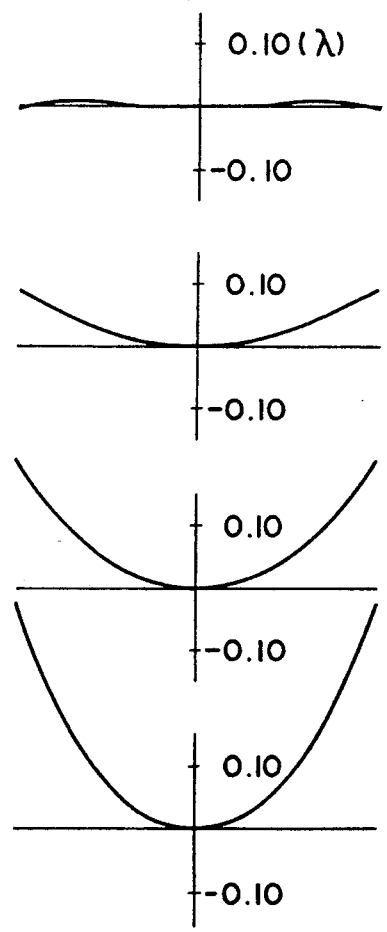

FIG. 30
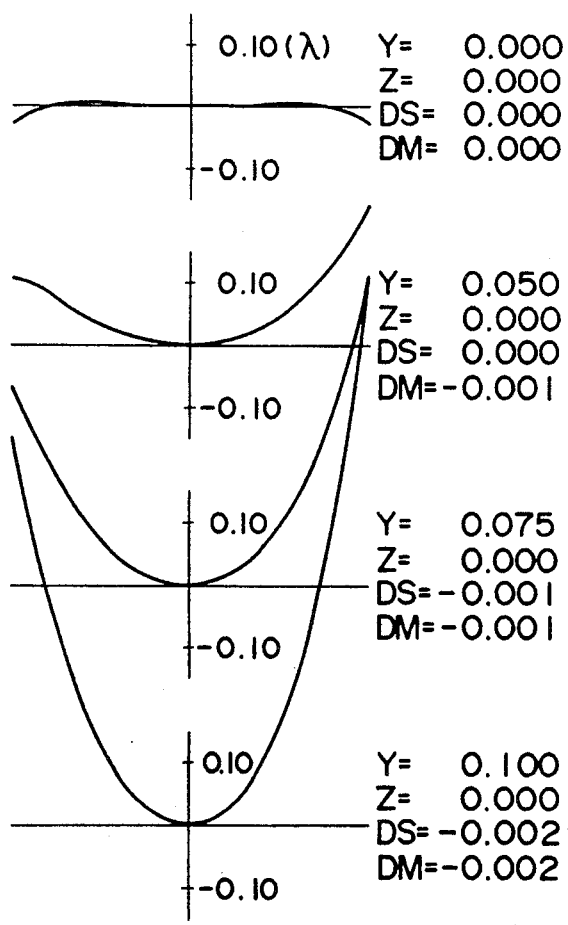
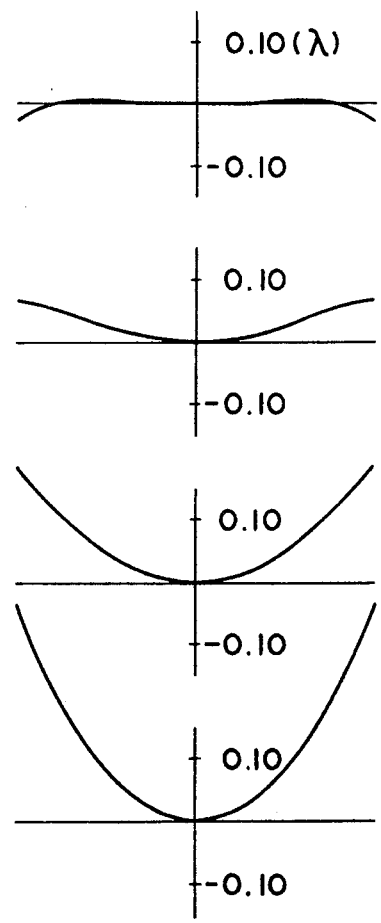

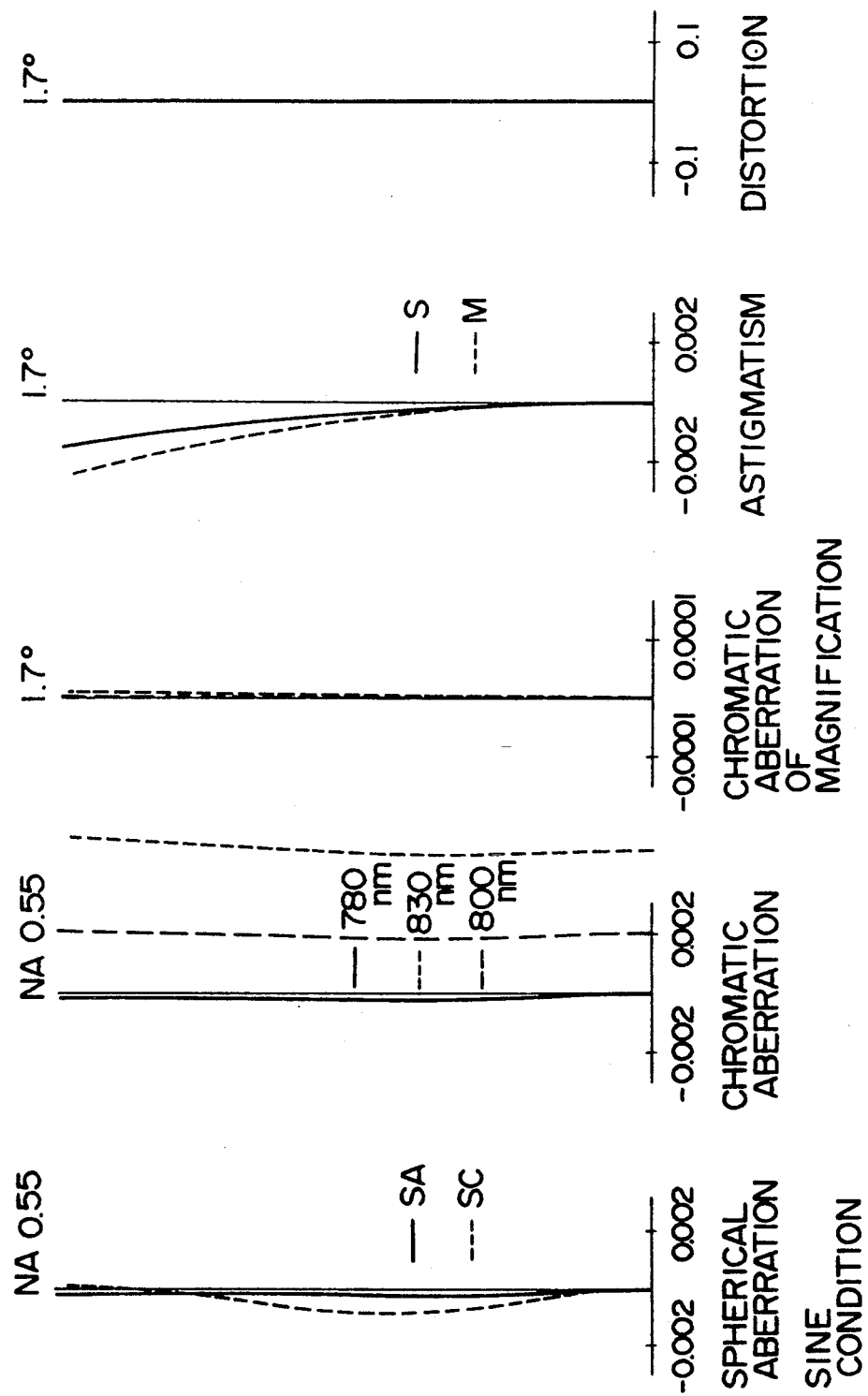
F I G. 31

FIG. 32
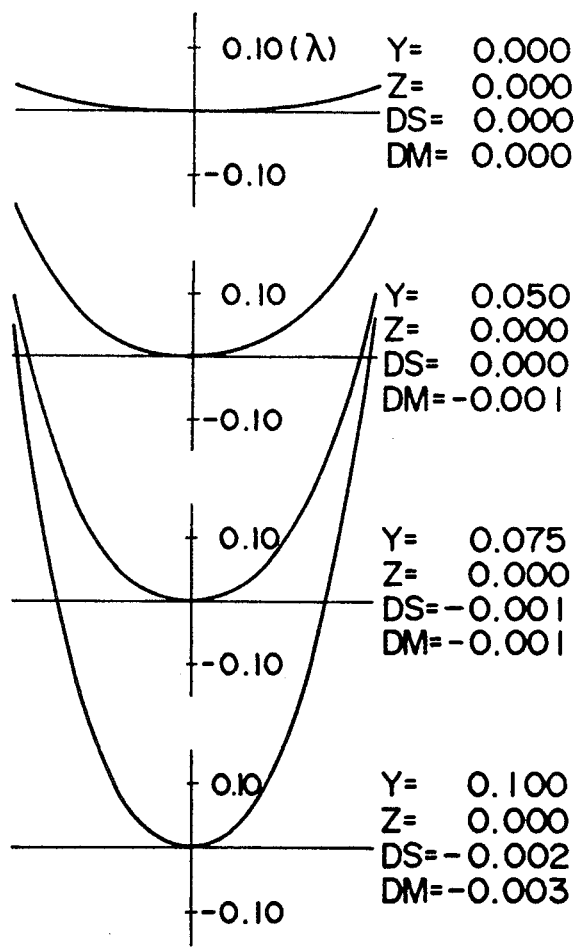
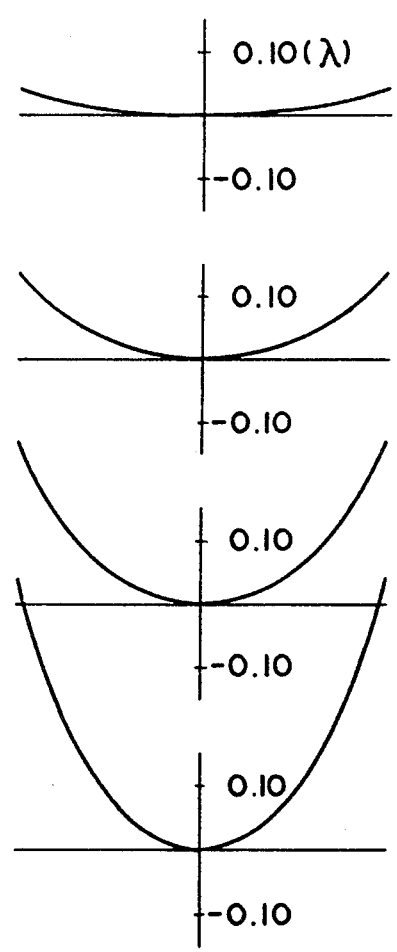

FIG.35
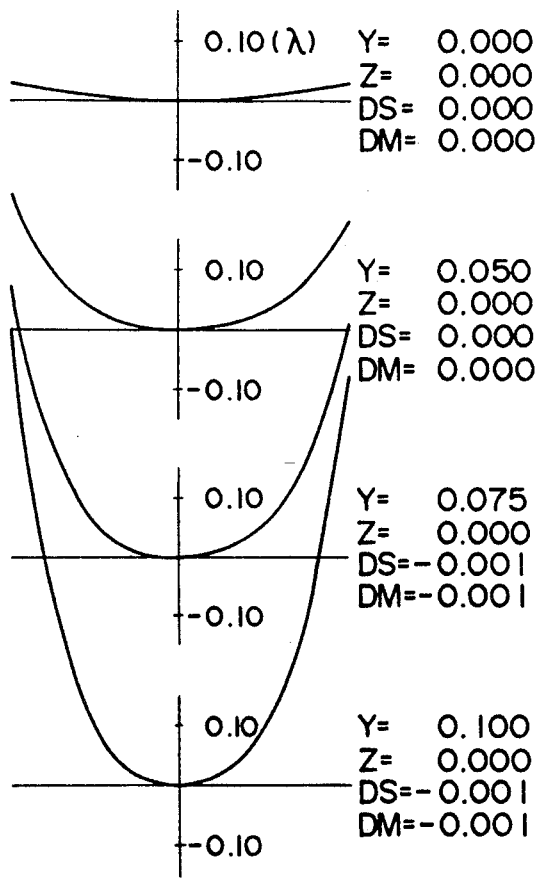
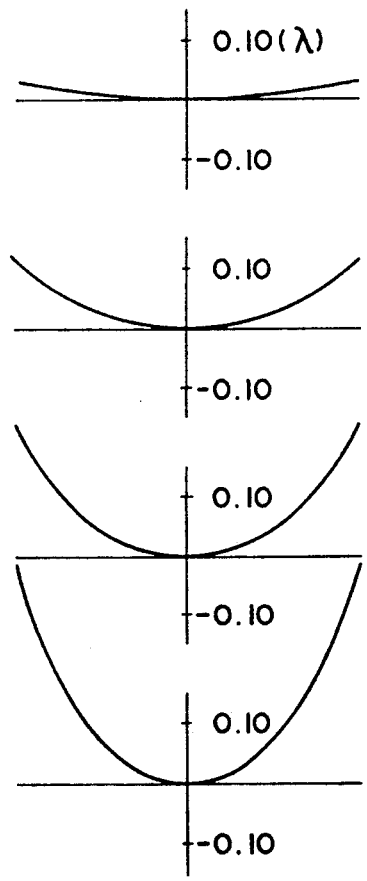

FIG. 37
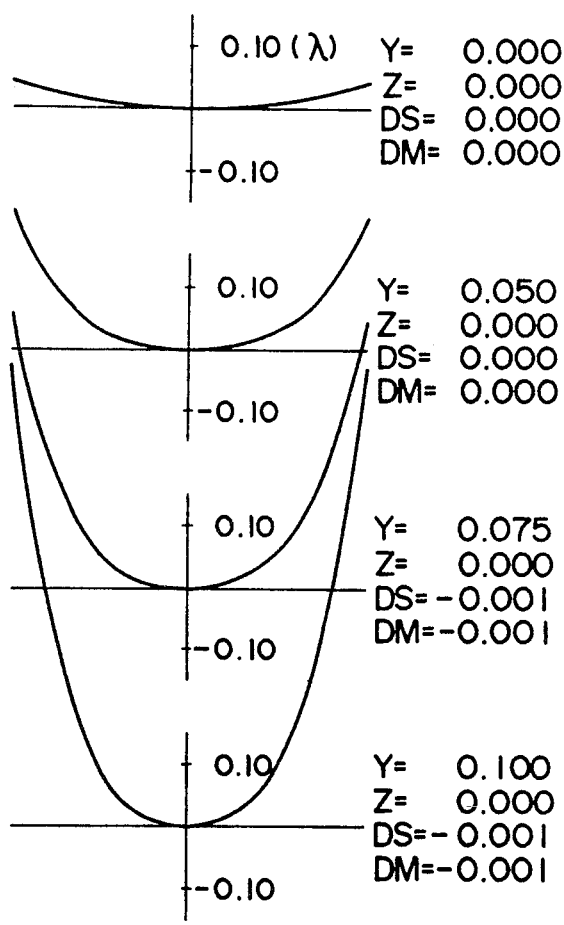
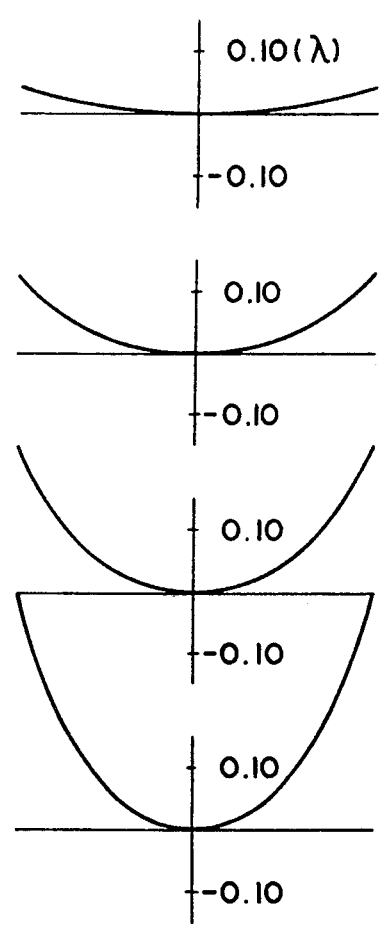

FIG. 42
MERIDIONAL 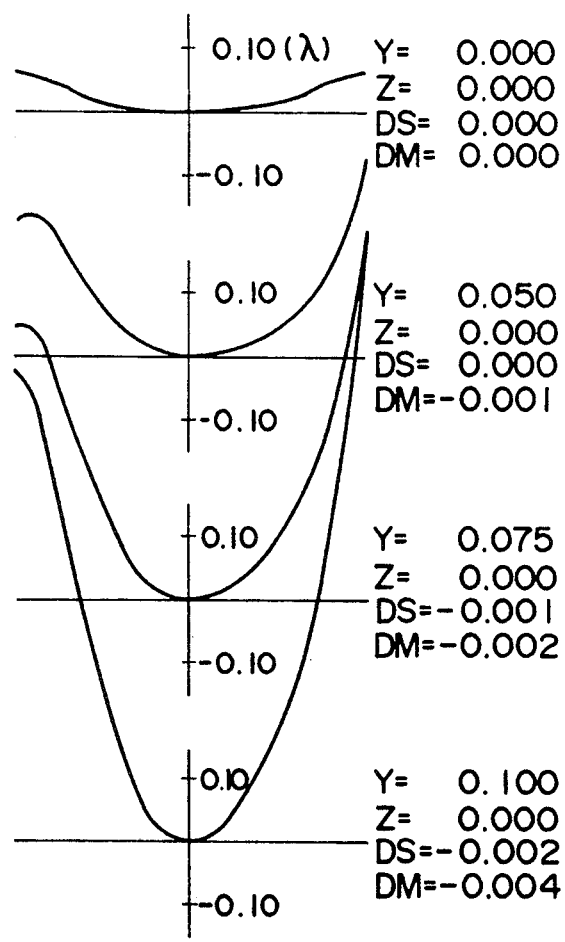 SAGITTAL 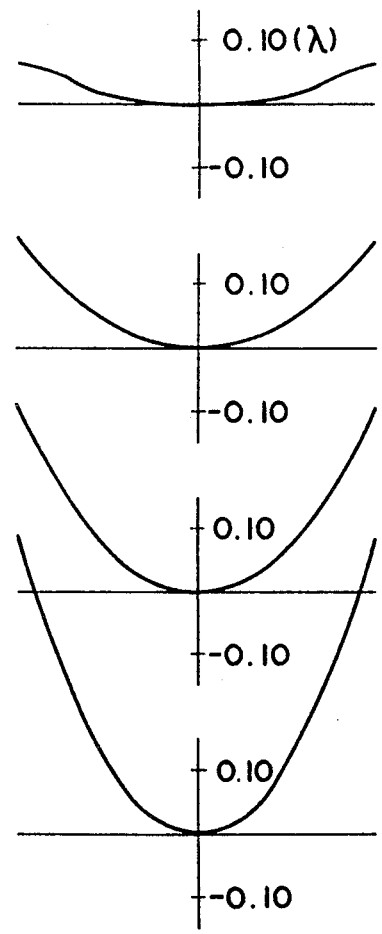

OBJECTIVE LENS SYSTEM OF OPTICAL INFORMATION RECORDING/REPRODUCING APPARATUS

This application is a continuation, of application Ser. No. 07/486,600, filed Feb. 28, 1990, now abandoned.

BACKGROUND OF THE INVENTION

1. Field of the Invention

This invention relates to an objective lens system of an optical information recording/reproducing apparatus in which a semiconductor laser is used as a light source.

2. Description of the Prior Art

An optical system of an optical information recording/reproducing apparatus, such as optical disk apparatus, etc. includes a light source portion having a semiconductor laser, and an objective lens system converging (focusing) the luminous flux emitted from the light source portion onto an optical disk, and a signal detecting optical system which is adapted to read information recorded in the disk and error signals by reflected light from the optical disk.

Also, the objective lens system is mounted on an actuator which is designed such that the objective lens can be finely moved at least in the optical axis direction thereof (focusing servo) so that an out of focus condition caused by warping of the disk, etc. can be corrected.

FIG. 40 shows an prior art objective lens system constructed of four pieces of lens glass. Concrete numerical examples are as shown in Table 1. In the table, the reference character NA denotes the numerical aperture, f denotes a focal length of the objective lens system at a wavelength of 780 nm, $\omega$ denotes a half field angle, wd denotes a working distance between last surface of the objective lens system and the optical disk OD, r denotes the radius of curvature of a surface, d denotes a lens thickness or a spatial distance, $n_{780}$ denotes a refractive index at a wavelength of 780 nm of a lens, and $\nu_{780}$ denotes a dispersion of a lens in the vicinity of wavelength 780 nm.

TABLE 1

NA = 0.55 f = 3.29 $\omega$ = 1.7° wd = 1.487

| surface No. | r | d | $n_{780}$ | $\nu_{780}$ |
|---|---|---|---|---|
| 1 | 45.570 | 1.330 | 1.61139 | 1451 |
| 2 | −3.042 | 0.700 | 1.82484 | 554 |
| 3 | −26.608 | 0.080 | | |
| 4 | 5.310 | 1.200 | 1.61139 | 1454 |
| 5 | −12.181 | 0.080 | | |
| 6 | 2.600 | 1.020 | 1.76204 | 1013 |
| 7 | 4.875 | | | |

Various aberrations of this objective lens system are shown in FIG. 41 and the wave aberrations are shown in FIG. 42.

By the way, an emitting light wavelength of the semiconductor laser used as a light source is shifted by changing of output power and/or temperature. Because of the foregoing reason, when the chromatic aberration of the lens system is not yet corrected, the position of a light converging point is varied by shifting the wavelength. But an out of focus condition due to a comparatively gentle change of a wavelength caused by change of temperature or the like is automatically corrected by the afore-mentioned focusing servo when the collimator lens is corrected in chromatic aberration and change of temperature.

However, at the time when data is written, an oscillation wavelength of the semiconductor laser is instantaneously shifted by several nm between a region where the temperature is increased and a region where the temperature is not increased. And the out of focus condition caused by such radical shift cannot be corrected by the above-mentioned focusing servo.

When the light converging position is not coincident with the recording surface of the disk, there is a high possibility that incorrect writing (i.e. recording) and reading are effected.

Therefore, especially when writing is effected, correction of the chromatic aberration of the objective lens system is important.

An optical system in which the converging lens itself is corrected in chromatic aberration is disclosed in, for example, Japanese Patent Early Laid-open Publication No. Sho 63-10118, Japanese Patent Early Laid-open Publication No. Sho 60-232519 and Japanese Patent Early Laid-open Publication No. Sho 58-72114.

The lens of the Japanese Patent Early Laid-open Publication No. Sho 63-10118 is of a three piece structure including an aspherical lens, while the lenses of the Japanese Patent Early Laid-open Publication No. Sho 60-232519 and the Japanese Patent Early Laid-open Publication No. Sho 58-72114 are of a four piece structure of lens glass.

However, the lenses which are disclosed in above publications are short in working distance. Therefor, there are such problems, such as that the range in which the objective lens system is movable, is too narrow.

Also, Japanese Patent Early Laid-open Publication No. Sho 62-269922 discloses an optical system for correcting the chromatic aberration of an objective lens by excessively correcting the chromatic aberration of a collimator lens. With this construction, it is necessary to excessively correct even a focusing error detecting optical system because otherwise an out of focus condition is generated, caused by a focusing servo.

However, the correcting amount of the chromatic aberration of the focusing error detecting optical system is proportional to a second raised power of the ratio M between a focal length of a condenser lens of this optical system, and a focal length of the objective lens. Therefore, in an ordinary optical disk apparatus, taking a value of about M=10 in view of the size of a light receiving element, it is difficult to design a system where the condenser lens has a sufficient correcting amount of chromatic aberration.

SUMMARY OF THE INVENTION

This invention has been accomplished in order to solve the above-mentioned problems.

The objective lens system of the optical information recording/reproducing apparatus must have a convex surface in order to exhibit a strong converging force for converging the luminous flux to the recording surface of the disk. And in order to maintain the converging efficiency high, it is necessary to fully correct the spherical aberration and the coma aberration.

In order to restrain the coma aberration, it is necessary to satisfy the sine condition. To this end, it is necessary to provide a strong convex converging surface on the light source side. This strong converging surface is preferably disposed near the disk in order to obtain enough working distance.

This converging lens is formed into an aspherical lens having a larger radius of curvature as it goes toward the peripheral portion thereof, in order to correct the spherical aberration and the coma aberration by a single lens and also in order to obtain a sufficient edge thickness necessary for processing while restraining the central thickness thereof.

Further, the objective lens system must include a chromatic aberration correcting element which hardly has a power in order to correct the chromatic aberration of the converging lens.

The chromatic aberration correcting element is constructed of a combination of a positive lens with a negative lens having a different Abbe number. In order to increase the corrected amount of the chromatic aberration, it is desirable that these lenses are cemented with each other. The reason is that if a spatial distance exists between the positive lens and the negative lens, a total reflection occurs at the peripheral portion thereby generating an eclipse, and an aberration fluctuation occurs when a distance error takes place.

Therefor, an objective lens system according to the present invention consists of an converging lens which has both surfaces formed of a convex aspherical surface and a radius of curvature which is increased as it goes toward the periphery from the center thereof. The radius of curvature is disposed such that a small surface thereof is faced toward the light source portion side; and a chromatic aberration correcting element having almost no power is disposed towards the light source side of said converging lens and adapted to correct a chromatic aberration of the converging lens. The correcting element is constructed of a positive and negative lenses cemented to each other.

BRIEF DESCRIPTION OF THE DRAWINGS

FIG. 3 are wave aberration diagrams of the objective lens system shown in FIG. 1.

FIG. 7 are wave aberration diagrams of the objective lens system shown in FIG. 5.

FIG. 10 are wave aberration diagrams of the objective lens system shown in FIG. 8.

FIG. 13 are wave aberration diagrams of the objective lens system shown in FIG. 11.

FIG. 16 are wave aberration diagrams of the objective lens system shown in FIG. 14.

FIG. 19 are wave aberration diagrams of the objective lens system shown in FIG. 17.

FIG. 22 are wave aberration diagrams of the objective lens system shown in FIG. 20.

FIG. 24 are wave aberration diagrams of a single unit of the converging lens shown in FIG. 20.

FIG. 27 are wave aberration diagrams of the objective lens system shown in FIG. 25.

FIG. 30 are wave aberration diagrams of the objective lens system shown in FIG. 28.

FIG. 31 are various aberration diagrams of a single unit of the converging lens shown in FIG. 28.

FIG. 32 are wave aberration diagrams of a single unit of the converging lens shown in FIG. 28.

FIG. 35 are wave aberration diagrams of the objective lens system shown in FIG. 33.

FIG. 37 are wave aberration diagrams of a single unit of the converging lens shown in FIG. 33.

FIG. 42 are wave aberration diagrams of the objective lens system shown in FIG. 40.

DETAILED DESCRIPTION OF THE EMBODIMENTS

Figure 1:
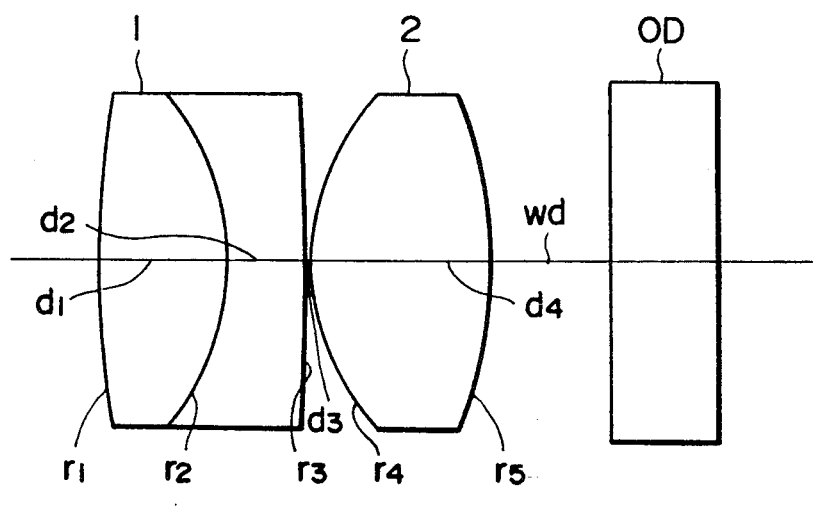
FIG. 1 is a lens diagram showing EXAMPLE 1 of an objective lens system according to the present invention.

The embodiment of the present invention will now be described hereinafter with reference to the drawings.

Regarding the chromatic aberration correcting element, the smaller the radius of curvature of the cemented surfaces is and the larger the difference in positive and negative refractive indexes is, the more significant the generation of the aberration becomes. As the element itself hardly has power, when the aberration is generated in the cemented surface, it is difficult to correct the aberration within the element. Accordingly, it becomes necessary to restrict the generation of aberration at the cemented surfaces as much as possible.

In order to generate the aberration, there are means for making the radius of curvature large and means for making the difference in refractive indexes small. However, when the cemented surfaces are brought very close to a surface, the intended function to correct the chromatic aberration cannot be performed. Accordingly, there is a limit in reduction of the aberration caused by the former means. On the contrary, when the refractive indexes are made almost equal, the generation of the spherical aberration and the coma aberration can be restrained even when the radius of curvature becomes considerable. By differentiating the dispersion, it becomes possible to apply a change in chromatic aberration.

In order to satisfy the above requirements, the objective lens systems shown in the following examples satisfy the conditions set forth hereunder.

$$|f/f_c| < 0.20 \qquad (1)$$

$$|r_2/f| > 0.70 \qquad (2)$$

$$\nu_{n780} < 700 \qquad (3)$$

$$\nu_{p780} > 800 \qquad (4)$$

$$n_{p780} > 1.55 \qquad (5)$$

$$|n_{p780} - n_{n780}| \times 10^5 < 20.000 \qquad (6)$$

$$(n_{p780} - 1)(1 - \nu_{n780}/\nu_{p780}) > 0.2 \qquad (7)$$

The symbolic characters used in the relations have the following meanings.

f: focal length of whole objective lens system
$f_c$: focal length of chromatic aberration correcting element
$r_2$: radius of curvature of cemented surface
$n_{n780}$, $n_{n830}$: refractive indexes in wavelengths 780 nm, 830 nm of a negative lens
$n_{p780}$, $n_{p830}$: refractive indexes in wavelengths 780 nm, 830 nm of a positive lens
$\nu_{n780}$: dispersion of a negative lens in the vicinity of wavelength 780 nm wherein; $\nu_{n780} = n_{n780}/(n_{n780} - n_{n830})$
$\nu_{p780}$: dispersion of a positive lens in the vicinity of wavelength 780 nm wherein; $\nu_{p780} = n_{p780}/(n_{p780} - n_{p830})$.

The relation (1) stipulates a refracting power of the chromatic aberration correcting element. If $f/f_c$ is lower than $-0.02$, it is difficult to maintain enough working distance. If $f/f_c$ is greater than $+0.02$, the lens becomes large in diameter and heavy in weight.

The relation (2) stipulates a condition for maintaining the edge thickness and restraining the center thickness of the positive lens of the chromatic aberration correcting element. If this condition is not satisfied, as a radius of curvature of the cemented surface is too small, a higher-order spherical aberration is generated, and as total length of the lens system is too long, it is impossible to restrain a weight thereof.

By the way, the higher the refractive index of the positive and negative lenses of the chromatic aberration correcting element are, the larger the radius of curvature of the cemented surface is. Also, as a difference between the refractive indexes of the positive and negative lenses is small and the radius of curvature of the cemented surface is large, it is desirable that the dispersion of the positive lens is large and that of negative lens is small.

In general, regarding glass material, the higher the refractive index is, the higher a dispersion is. Therefor if glass material of the negative lens satisfies the relation (3), the chromatic aberration correcting effect is obtained and refractive index thereof is higher than 1.70.

If a glass material of the positive lens of the chromatic aberration correcting element satisfies the relation (4), the element is able to achieve enough chromatic aberration correcting effect. However if this glass material does not satisfy the relation (5), great aberration is generated in the cemented surface due to the difference of the refractive indexes between the positive and negative lenses.

The relation (6) shows the condition for restraining the difference of refractive index of positive and negative lenses of the chromatic aberration correcting element and reducing the generation of aberrations other than the chromatic aberration, as much as possible.

However, even in the case that the condition of the relation (6) is satisfied, it is desirable that the radius of curvature of the cemented surfaces is as large as possible. The reason is that when the radius of curvature of the cemented surfaces is small, the thickness of the whole chromatic aberration correcting element becomes large in order to obtain the edge thickness of the positive lens, while when a lens having a large numerical aperture (NA) is used, a spherical aberration of a higher order is generated.

Therefore, the chromatic aberration correcting element must be formed of a combination of materials capable of increasing the radius of curvature of the cemented surfaces as much as possible, but within a limit able to exhibit a chromatic aberration correcting effect.

The relation (7) shows the condition for regulating the dispersion of quality of a chromatic aberration correcting element in order to satisfy the chromatic aberration correcting effect. In case this condition is not satisfied, even if a converging lens having the smallest dispersion CaFK95 (Merchandise Name: Sumida Kogaku) among raw materials for the use of an aspherical lens obtainable at present, the chromatic aberration correcting element becomes too thick in order to sufficiently correct the chromatic aberration, thus resulting in a problem in respect of weight or space.

EXAMPLE 1

FIG. 1 shows EXAMPLE 1 of the objective lens system and concrete numerical values for the construction is shown in TABLE 2.

This objective lens system consists of a chromatic aberration correcting element 1 and a converging lens 2, arranged in order, from a light source side (left side in figure).

The chromatic aberration correcting element 1, comprises a positive lens and a negative lens which are cemented with each other.

The converging lens 2 is formed as an aspherical lens having a larger radius of curvature as it goes toward the peripheral portion thereof.

Concrete numerical constructions are as shown in Table 2. In the Tables, the reference character NA denotes the numerical aperture, f denotes a focal length of the objective lens system in a wavelength of 780 nm, ω denotes a half field angle, wd denotes a working distance between last surface of the objective lens system and the first surface of the optical disk OD, r denotes the radius of curvature of a surface, d denotes a lens thickness or a spatial distance, $n_{780}$ denotes a refractive index in a wavelength of 780 nm of a lens, and $v_{780}$ denotes a dispersion of a lens in the vicinity of wavelength 780 nm.

The surface NO. 4 and 5 denotes the converging lens. Regarding the glass material, the converging lens is a polymethylmethacrylate and the cover glass OD of the optical disk is BK7.

TABLE 2

| surface NO. | NA = 0.55 f = 3.30 ω = 1.7° wd = 1.350 | | | | |
|---|---|---|---|---|---|
| | r | d | $n_{780}$ | $v_{780}$ | glass material name |
| 1 | 10.330 | 1.450 | 1.61139 | 1454 | PSk02 |
| 2 | −2.751 | 0.900 | 1.78565 | 601 | SFL6 |
| 3 | −27.147 | 0.050 | | | |
| 4 | 2.380 | 2.000 | 1.48479 | 1461 | |
| 5 | −3.752 | | | | |

The aspherical 4th and 5th surfaces are expressed as follows;

$$X = \frac{CY^2}{1 + \sqrt{1 - (1 + K)C^2Y^2}} + A_4Y^4 + A_6Y^6 + A_8Y^8 + A_{10}Y^{10} + A_{12}Y^{12}$$

wherein X is a distance from a tangential plane of the vertex of an aspherical surface, on the aspherical surface where Y is the height from the optical axis, C is the radius of curvature (1/r) of the vertex of the aspherical surface, K is the coefficient of a circular cone, and the $A_4 \sim A_{10}$ are aspherical surfaces coefficients. These aspherical coefficients of the converging lens are shown in TABLE 3.

Figure 2:
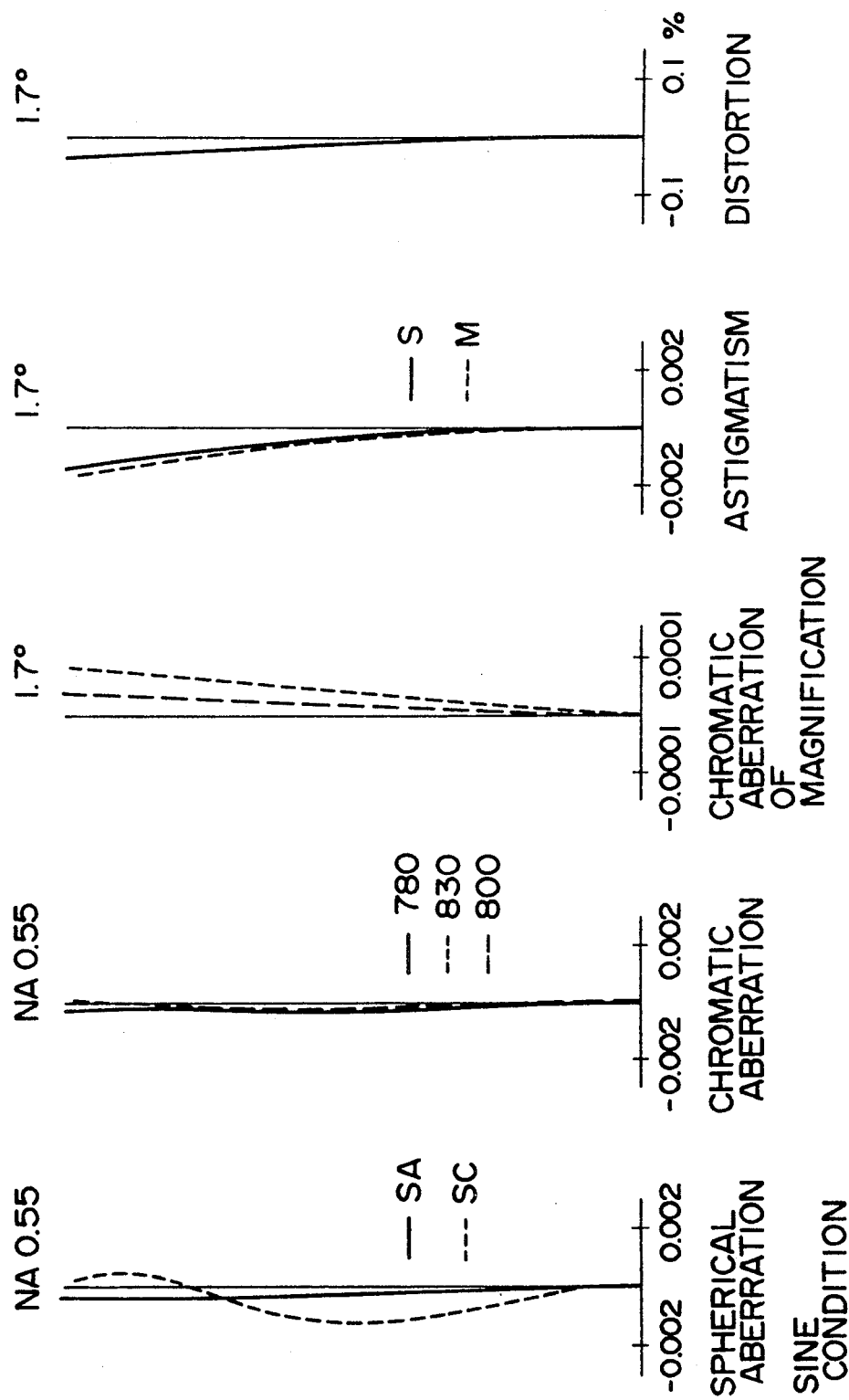
FIG. 2 are various aberration diagrams of the objective lens system shown in FIG. 1.

Various aberrations of this objective lens system are shown in FIG. 2 and the wave aberrations are shown in FIG. 3.

TABLE 3

| 4th surface | 5th surface |
|---|---|
| K = −0.6848E + 00 | K = −0.1514E + 01 |
| A4 = 0.1011E − 02 | A4 = 0.1259E − 01 |
| A6 = −0.1518E − 03 | A6 = −0.2710E − 02 |
| A8 = −0.2169E − 04 | A8 = 0.3962E − 03 |
| A10 = −0.5843E − 05 | A10 = −0.3097E − 04 |
| A12 = 0.0000E + 00 | A12 = 0.0000E + 00 |

In a case that a single unit of the converging lens shown in FIG. 1 is used as an objective lens system, as the chromatic aberration is not able to corrected, an out of condition occurs by shifting of wavelength. According to the out of focus condition, wave aberration is generated.

Figure 4:
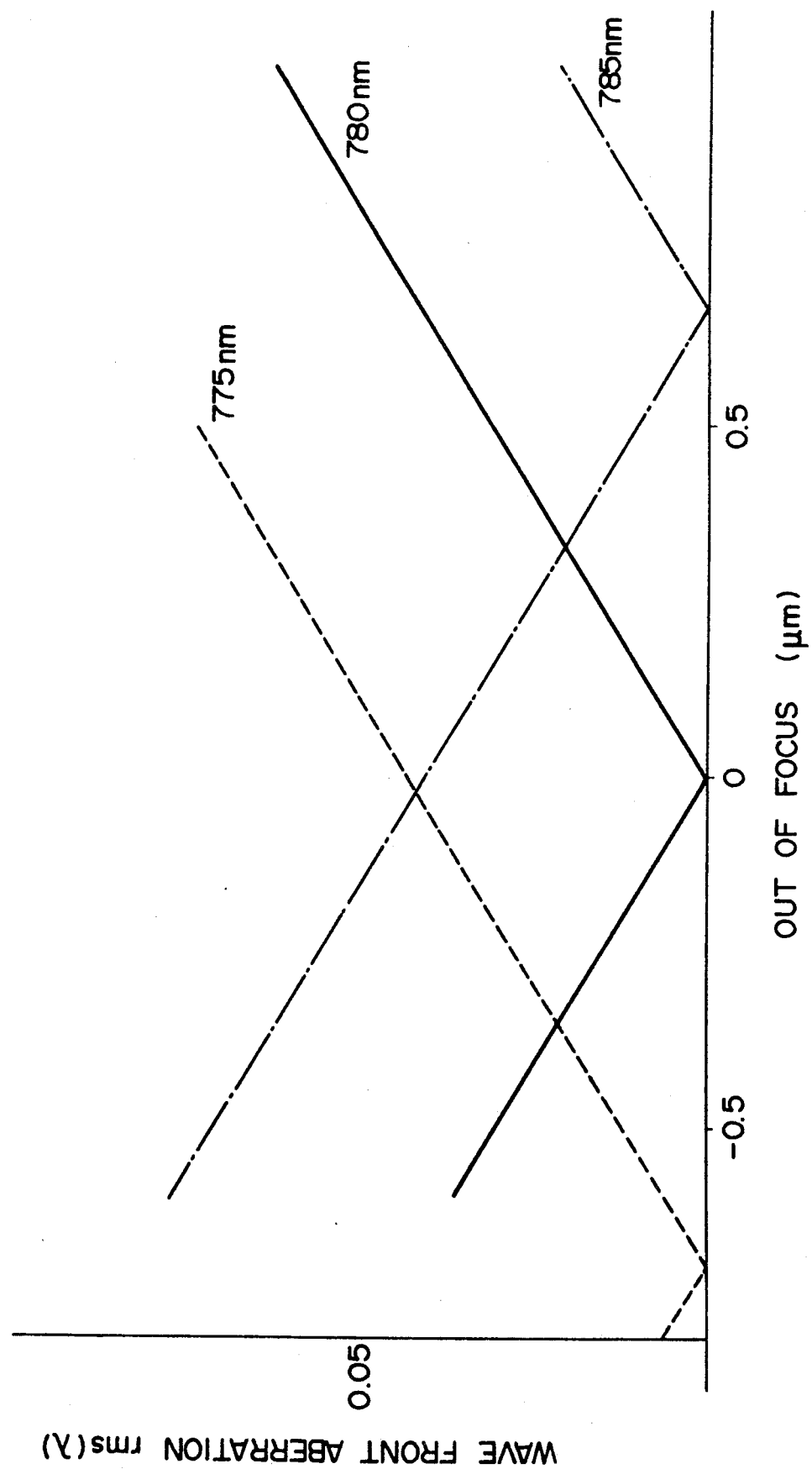
FIG. 4 is a graph showing the movement of a light converged position caused by wavelength fluctuation by the single unit of the conversing lens shown in FIG. 1.

Deterioration of wave aberration based on the out of focus condition of the single body of the converging lens 2 is as shown in FIG. 4. It will be understood from FIG. 4 that when the wavelength is shifted by 5 nm, a wave aberration of about 0.04λ is generated. In order to maintain the efficiency as an objective lens, the limit of the wave aberration is about 0.05λ. Actually, however, as there exists out of focus conditions based on factors other than the chromatic aberration, there is a possibility that the above limit is exceeded by shift of the wavelength of about 5 nm.

EXAMPLE 2

Figure 5:
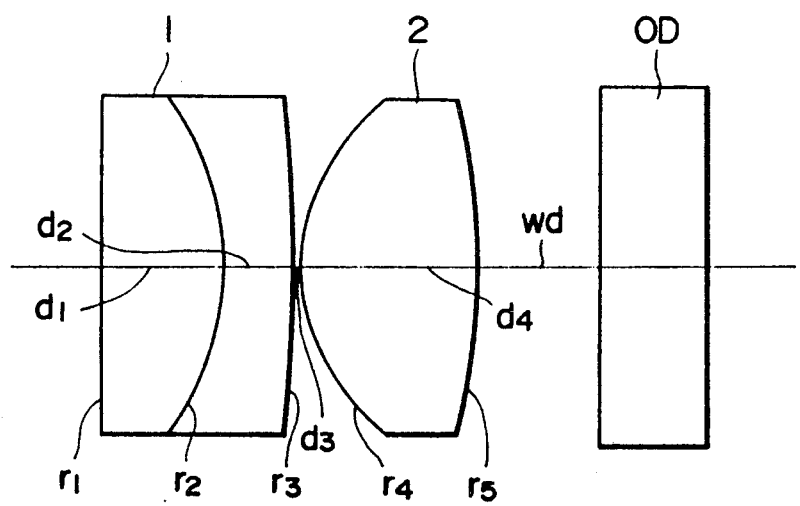
FIG. 5 is a lens diagram showing EXAMPLE 2 of an objective lens system according to the present invention.

FIG. 5 shows EXAMPLE 2 of the objective lens system and concrete numerical value of construction are shown in TABLE 4. The aspherical coefficients of the converging lens are shown in TABLE 5.

TABLE 4

| surface NO. | NA = 0.55 f = 3.30 ω = 1.7° wd = 1.350 | | | | |
|---|---|---|---|---|---|
| | r | d | $n_{780}$ | $v_{780}$ | glass material name |
| 1 | 59.155 | 1.400 | 1.68442 | 1136 | LaK08 |
| 2 | −3.042 | 0.800 | 1.78565 | 601 | SFL6 |
| 3 | −13.310 | 0.050 | | | |
| 4 | 2.032 | 2.000 | 1.43107 | 2626 | CaFk95 |
| 5 | −5.229 | | | | |

TABLE 5

| 4th surface | 5th surface |
|---|---|
| K = −0.6514E + 00 | K = −0.1868E + 01 |
| A4 = 0.3191E − 02 | A4 = 0.1388E − 01 |
| A6 = 0.7439E − 04 | A6 = −0.3220E − 02 |
| A8 = 0.9645E − 04 | A8 = 0.3918E − 03 |
| A10 = −0.2868E − 04 | A10 = −0.2037E − 04 |
| A12 = 0.0000E + 00 | A12 = 0.0000E + 00 |

Figure 6:
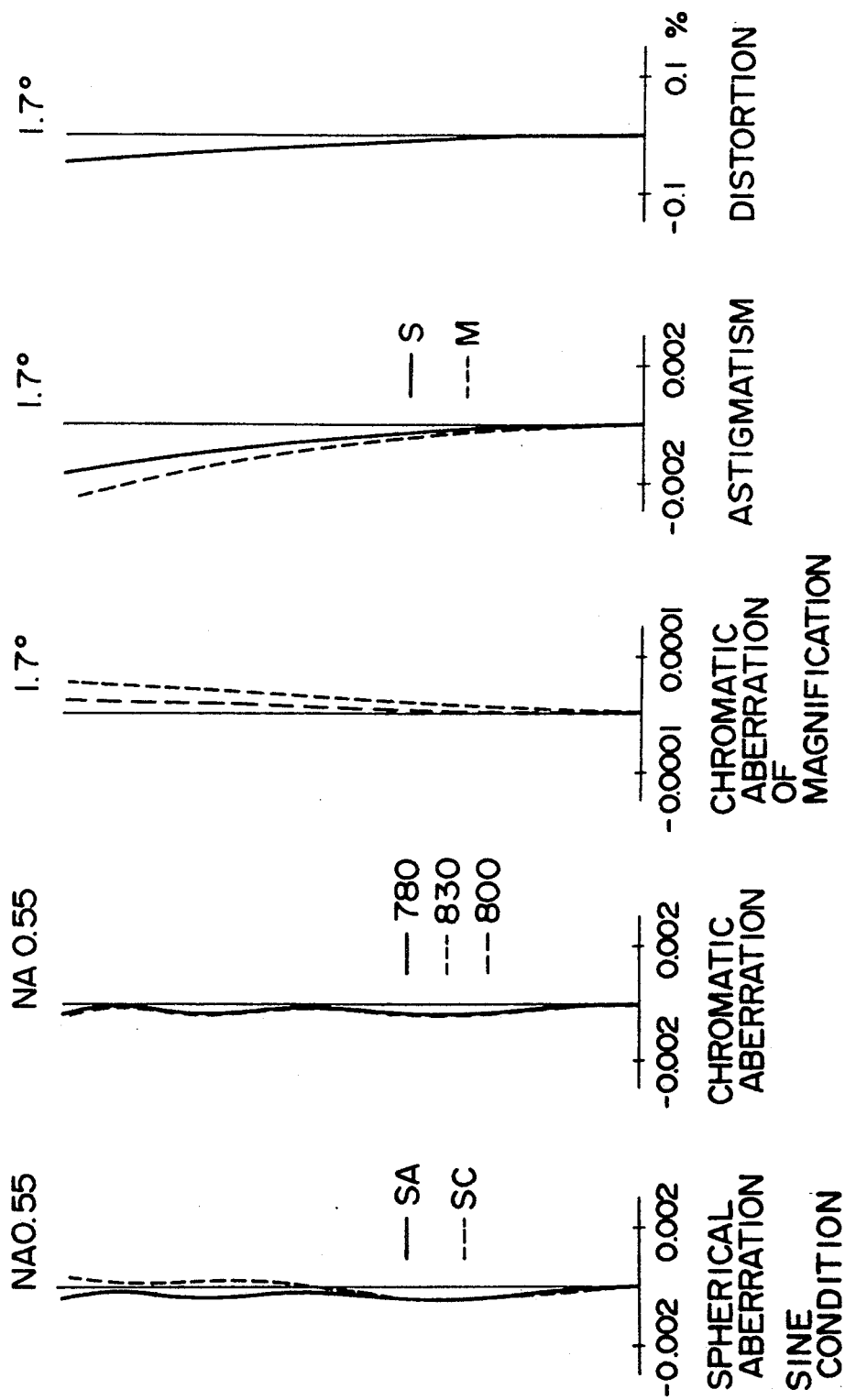
FIG. 6 are various aberration diagrams of the objective lens system shown in FIG. 5.

Various aberrations of this objective lens system are shown in FIG. 6 and the wave aberrations are shown in FIG. 7.

EXAMPLE 3

Figure 8:
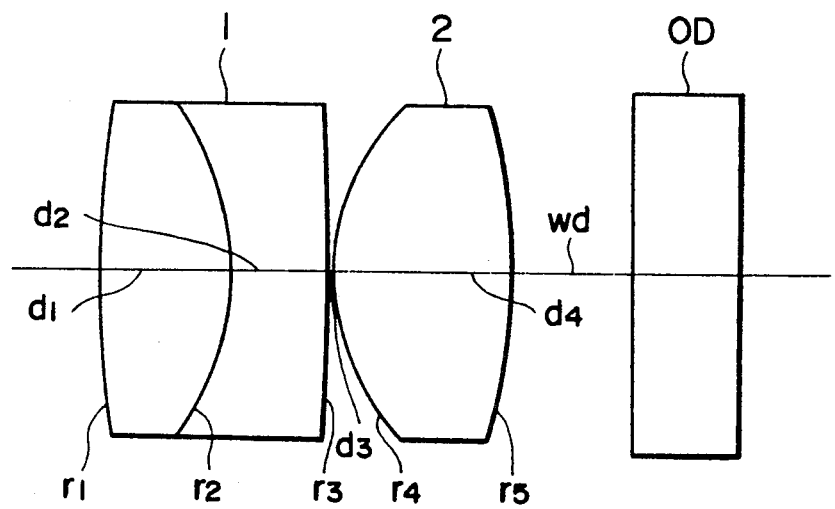
FIG. 8 is a lens diagram showing EXAMPLE 3 of an objective lens system according to the present invention.
Figure 9:
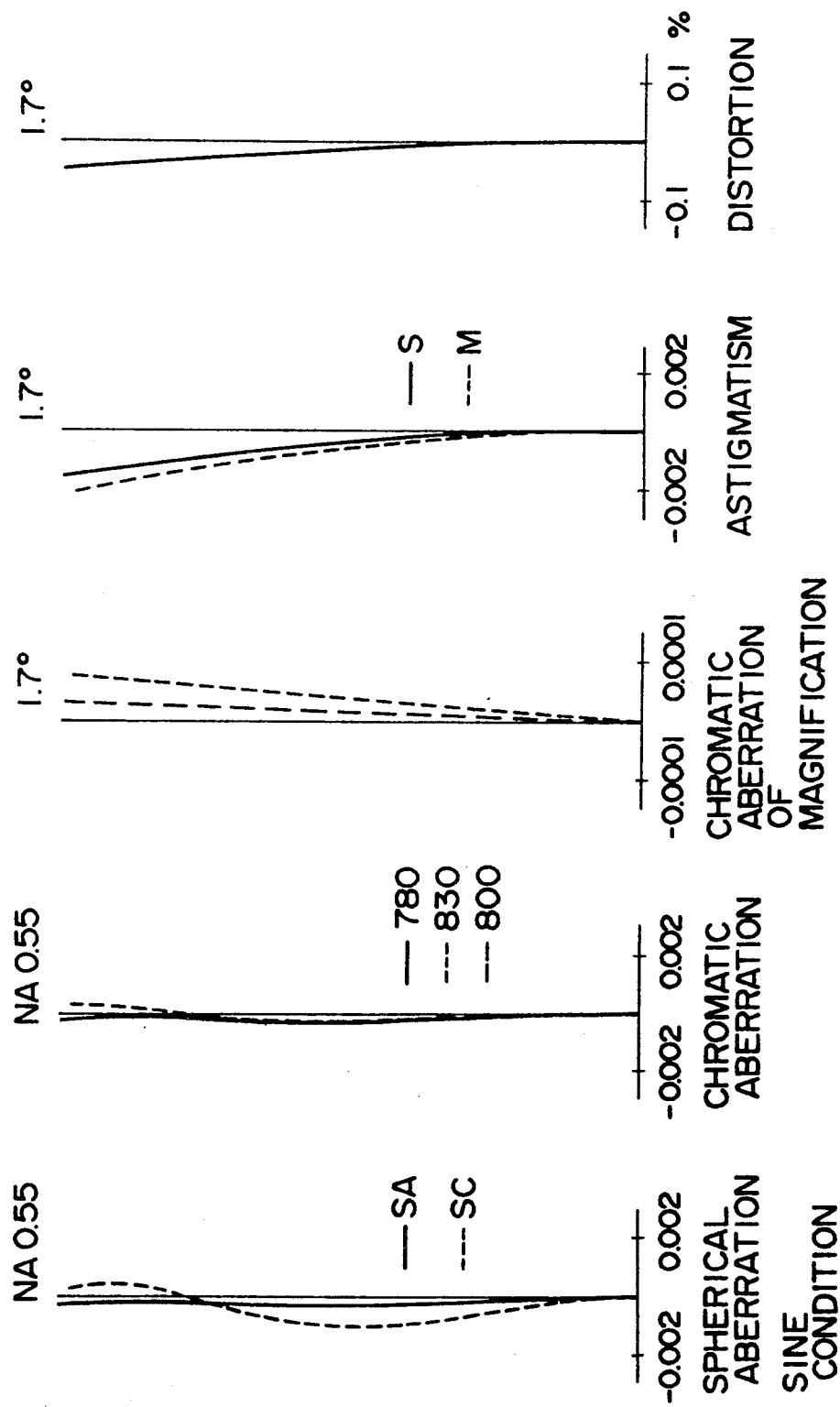
FIG. 9 are various aberration diagrams of the objective lens system shown in FIG. 8.

FIG. 8 shows EXAMPLE 3 of the objective lens system and concrete numerical values for construction are shown in TABLE 6. The aspherical coefficients of the converging lens are shown in TABLE 7. Various aberrations of this objective lens system are shown in FIG. 9 and the wave aberrations are shown in FIG. 10.

TABLE 6

| surface NO. | NA = 0.55 f = 3.30 ω = 1.7° wd = 1.350 | | | | |
|---|---|---|---|---|---|
| | r | d | $n_{780}$ | $v_{780}$ | glass material name |
| 1 | 11.816 | 1.450 | 1.61139 | 1454 | PSk02 |
| 2 | −3.120 | 1.100 | 1.78565 | 301 | SFL6 |
| 3 | −38.129 | 0.050 | | | |
| 4 | 2.378 | 2.000 | 1.53670 | 1507 | |
| 5 | −5.004 | | | | |

TABLE 7

| 4th surface | 5th surface |
|---|---|
| K = −0.6700E + 00 | K = −0.1070E + 01 |
| A4 = 0.1489E − 02 | A4 = 0.1175E − 01 |
| A6 = −0.3270E − 04 | A6 = −0.2023E − 02 |
| A8 = 0.7407E − 05 | A8 = 0.2206E − 03 |
| A10 = −0.7601E − 05 | A10 = −0.1196E − 04 |

EXAMPLE 4

Figure 11:
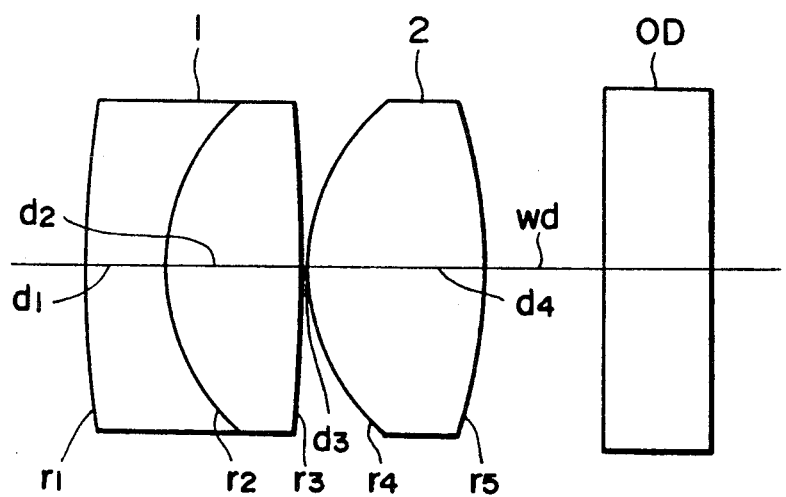
FIG. 11 is a lens diagram showing EXAMPLE 4 of an objective lens system according to the present invention.
Figure 12:
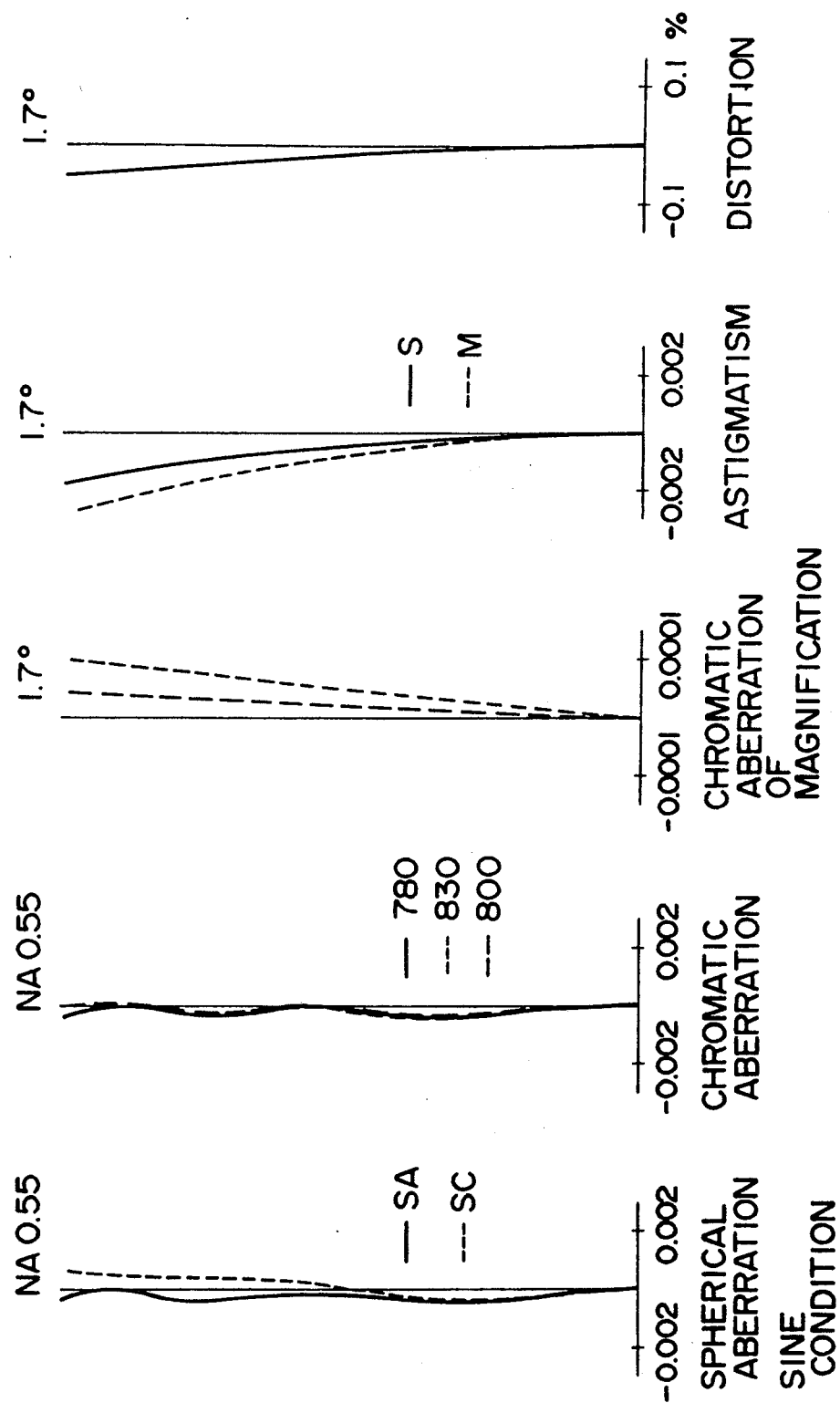
FIG. 12 are various aberration diagrams of the objective lens system shown in FIG. 11.

FIG. 11 shows EXAMPLE 4 of the objective lens system and concrete numerical value construction is shown in TABLE 8. The aspherical coefficients of the converging lens are shown in TABLE 9. Various aberrations of this objective lens system are shown in FIG. 12 and the wave aberrations are shown in FIG. 13.

TABLE 8

| surface NO. | NA = 0.55 f = 3.30 ω = 1.7° wd = 1.350 | | | | |
|---|---|---|---|---|---|
| | r | d | $n_{780}$ | $v_{780}$ | glass material name |
| 1 | 12.000 | 0.900 | 1.78565 | 601 | SFL6 |
| 2 | 2.400 | 1.500 | 1.61139 | 1454 | PSk02 |
| 3 | −32.300 | 0.050 | | | |
| 4 | 2.091 | 2.000 | 1.48479 | 1461 | |
| 5 | −4.915 | | | | |

TABLE 9

| 4th surface | 5th surface |
|---|---|
| K = −0.6557E + 00 | K = −0.4790E + 00 |
| A4 = 0.2626E − 02 | A4 = 0.1031E − 01 |
| A6 = −0.1800E − 03 | A6 = −0.2770E − 02 |
| A8 = 0.8103E − 04 | A8 = 0.3247E − 03 |
| A10 = −0.4767E − 04 | A10 = −0.2010E − 04 |
| A12 = 0.0000E + 00 | A12 = 0.0000E + 00 |

EXAMPLE 5

Figure 14:
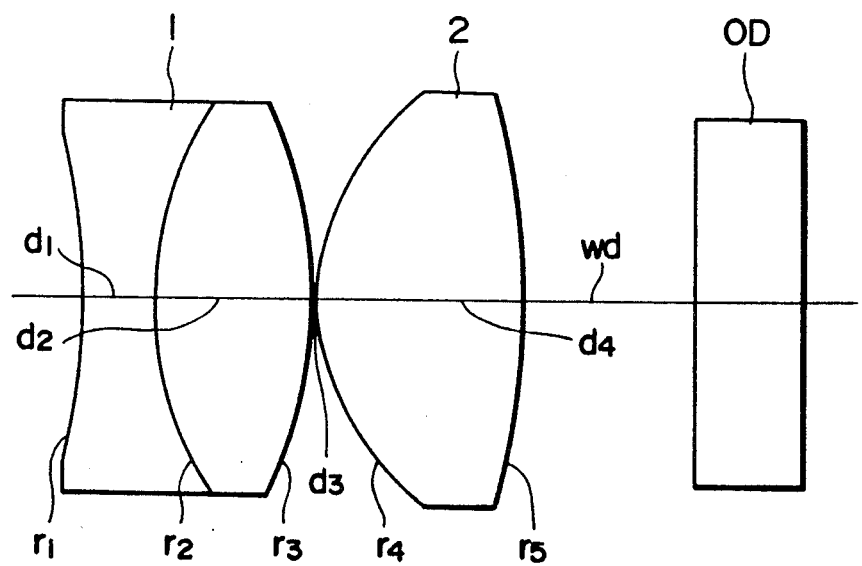
FIG. 14 is a lens diagram showing EXAMPLE 5 of an objective lens system according to the present invention.
Figure 15:
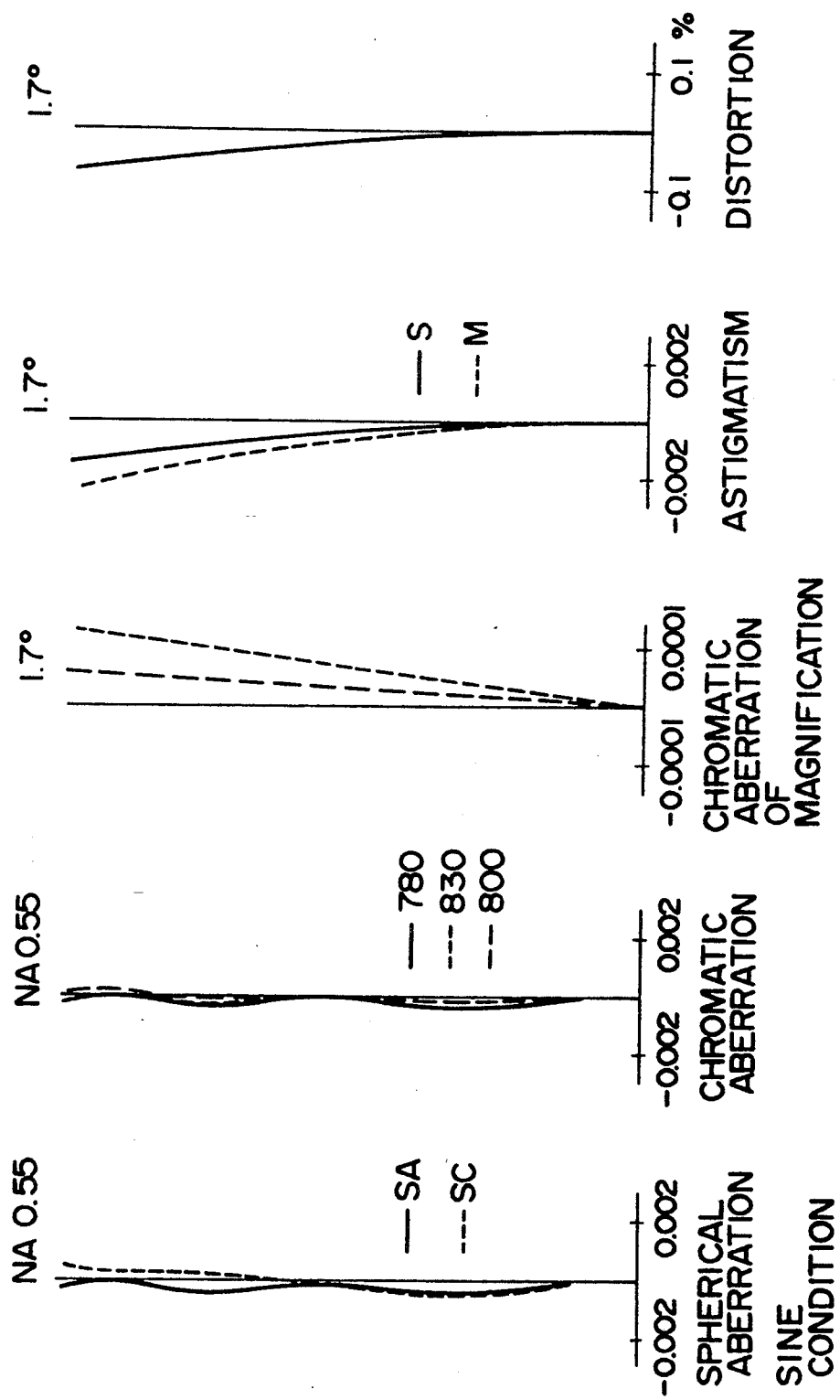
FIG. 15 are various aberration diagrams of the objective lens system shown in FIG. 14.

FIG. 14 shows EXAMPLE 5 of the objective lens system and concrete numerical value construction is shown in TABLE 10. The aspherical coefficients of the converging lens are shown in TABLE 11. Various aberrations of this objective lens system are shown in FIG. 15 and the wave aberrations are shown in FIG. 16.

TABLE 10

| surface NO. | NA = 0.55 f = 3.31 ω = 1.7° wd = 1,937 | | | | |
|---|---|---|---|---|---|
| | r | d | $n_{780}$ | $v_{780}$ | glass material name |
| 1 | −7.640 | 0.800 | 1.78565 | 601 | SFL6 |
| 2 | 3.894 | 1.750 | 1.61139 | 1454 | PSk02 |
| 3 | −5.000 | 0.050 | | | |
| 4 | 2.352 | 2.300 | 1.48479 | 1461 | |
| 5 | −7.269 | | | | |

TABLE 11

| 4th surface | 5th surface |
|---|---|
| K = −0.7522E + 00 | K = 0.000E + 00 |
| A4 = 0.1876E − 02 | A4 = 0.5351E − 02 |
| A6 = −0.1244E − 04 | A6 = −0.8424E − 03 |
| A8 = 0.2321E − 04 | A8 = 0.5166E − 04 |
| A10 = −0.7525E − 05 | A10 = −0.7905E − 06 |
| A12 = 0.0000E + 00 | A12 = 0.0000E + 00 |

EXAMPLE 6

Example 6 to 10 satisfy new conditions in addition to above condition (1) to (7).

First, relation (1) and (6) are limited in narrower range as followings;

$$|n_{p780} - n_{n780}| \times 10^5 < 1000 \tag{6}$$

$$|f/f_c| < 0.01 \tag{1}$$

In order to satisfy a new condition (1), as the difference of the refractive indexes between the positive and negative lenses of the chromatic aberration correcting element is reduced, spherical aberration is reduced. And if the objective lens system satisfies the new condition (6), power of the chromatic aberration correcting element is reduced. Therefore, generation of aberration is able to restrained even if positional error between the converging lens and the chromatic aberration correcting element occurs.

Furthermore, it is desirable to satisfy relations (8), (9).

$$|r_1/f| > 7 \tag{8}$$

$$|r_3/f| > 7 \tag{9}$$

The symbolic characters used in these relations have the following meanings.

$r_1$: radius of curvature of incident surface of the chromatic aberration correcting element $r_3$: radius of curvature of outgoing surface of the chromatic aberration correcting element f: focal length of whole objective lens system.

If the conditions is satisfied, an angular magnification of the chromatic aberration correcting element is restrained. Even if the chromatic aberration correcting element does not have a large power, if it has an angular magnification, the lens becomes large in diameter and working distance is increase.

Figure 17:
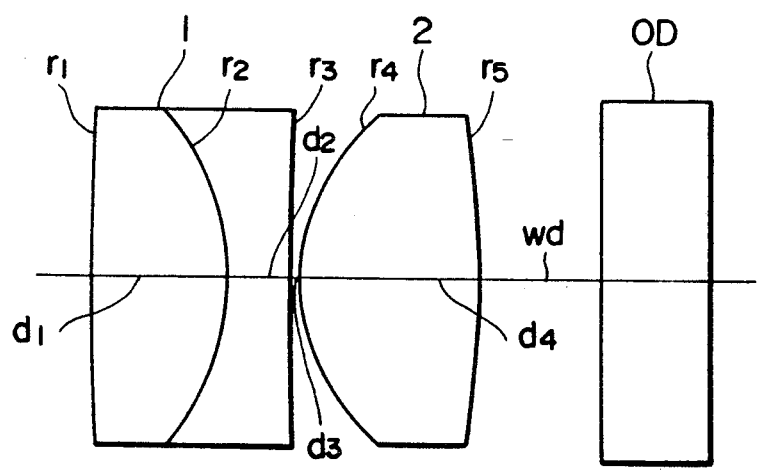
FIG. 17 is a lens diagram showing EXAMPLE 6 of an objective lens system according to the present invention.
Figure 18:
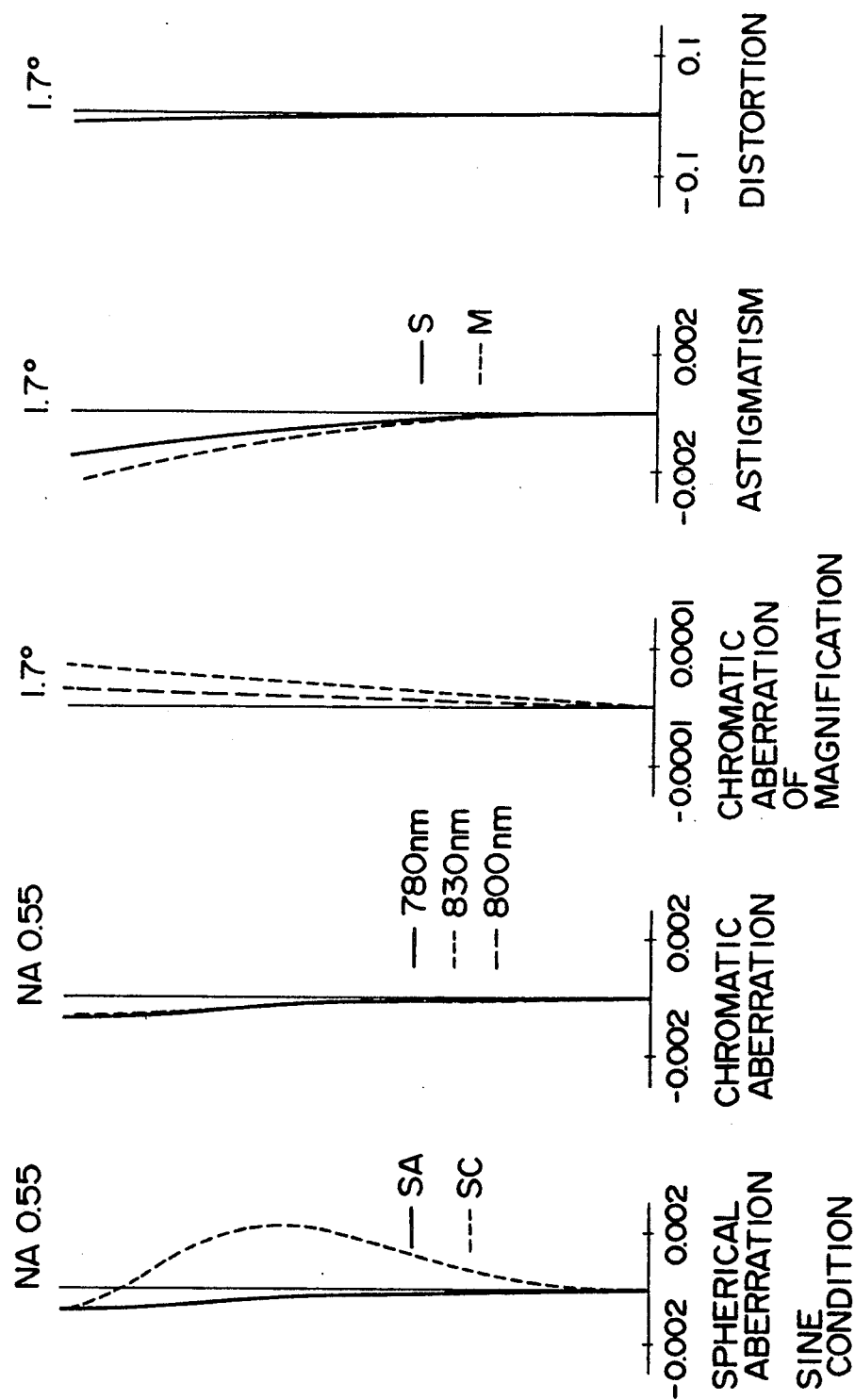
FIG. 18 are various aberration diagrams of the objective lens system shown in FIG. 17.

FIG. 17 shows EXAMPLE 6 of the objective lens system, and concrete numerical values of construction are shown in TABLE 12. The aspherical coefficients of the converging lens are shown in TABLE 13. Various aberrations of this objective lens system are shown in FIG. 18 and the wave aberrations are shown in FIG. 19.

TABLE 12

| surface NO. | NA = 0.55 f = 3.30 ω = 1.7° wd = 1.36 | | | | |
|---|---|---|---|---|---|
| | r | d | $n_{780}$ | $v_{780}$ | glass material name |
| 1 | 50.000 | 1.50 | 1.82195 | 875 | LaSF05 |
| 2 | −2.822 | 0.70 | 1.82484 | 553 | SFL03 |
| 3 | 50.000 | 0.10 | | | |
| 4 | 2.089 | 2.00 | 1.53670 | 1507 | |
| 5 | −6.770 | | | | |

TABLE 13

| 4th surface | 5th surface |
|---|---|
| K = −0.4168E + 00 | K = −0.5220E + 00 |
| A4 = −0.9556E − 03 | A4 = 0.1663E − 01 |
| A6 = −0.1979E − 03 | A6 = −0.3824E − 02 |
| A8 = 0.3396E − 05 | A8 = 0.5343E − 03 |
| A10 = −0.1894E − 04 | A10 = −0.3071E − 04 |
| A12 = 0.0000E + 00 | A12 = 0.0000E + 00 |

EXAMPLE 7

Figure 20:
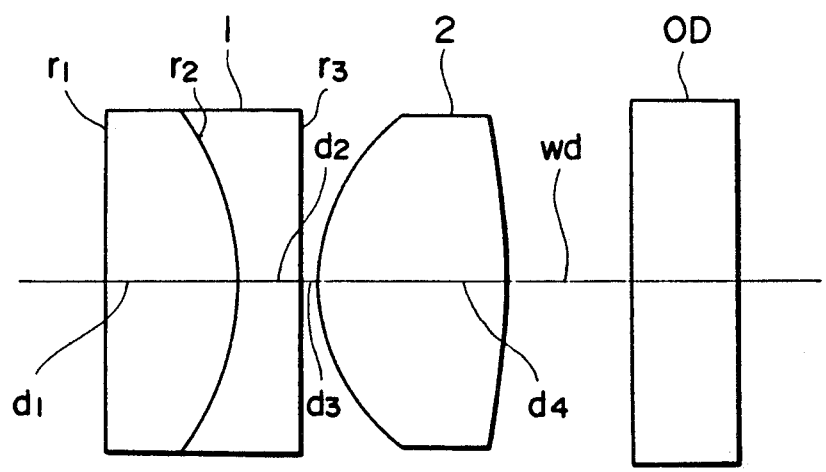
FIG. 20 is a lens diagram showing EXAMPLE 7 of an objective lens system according to the present invention.
Figure 21:
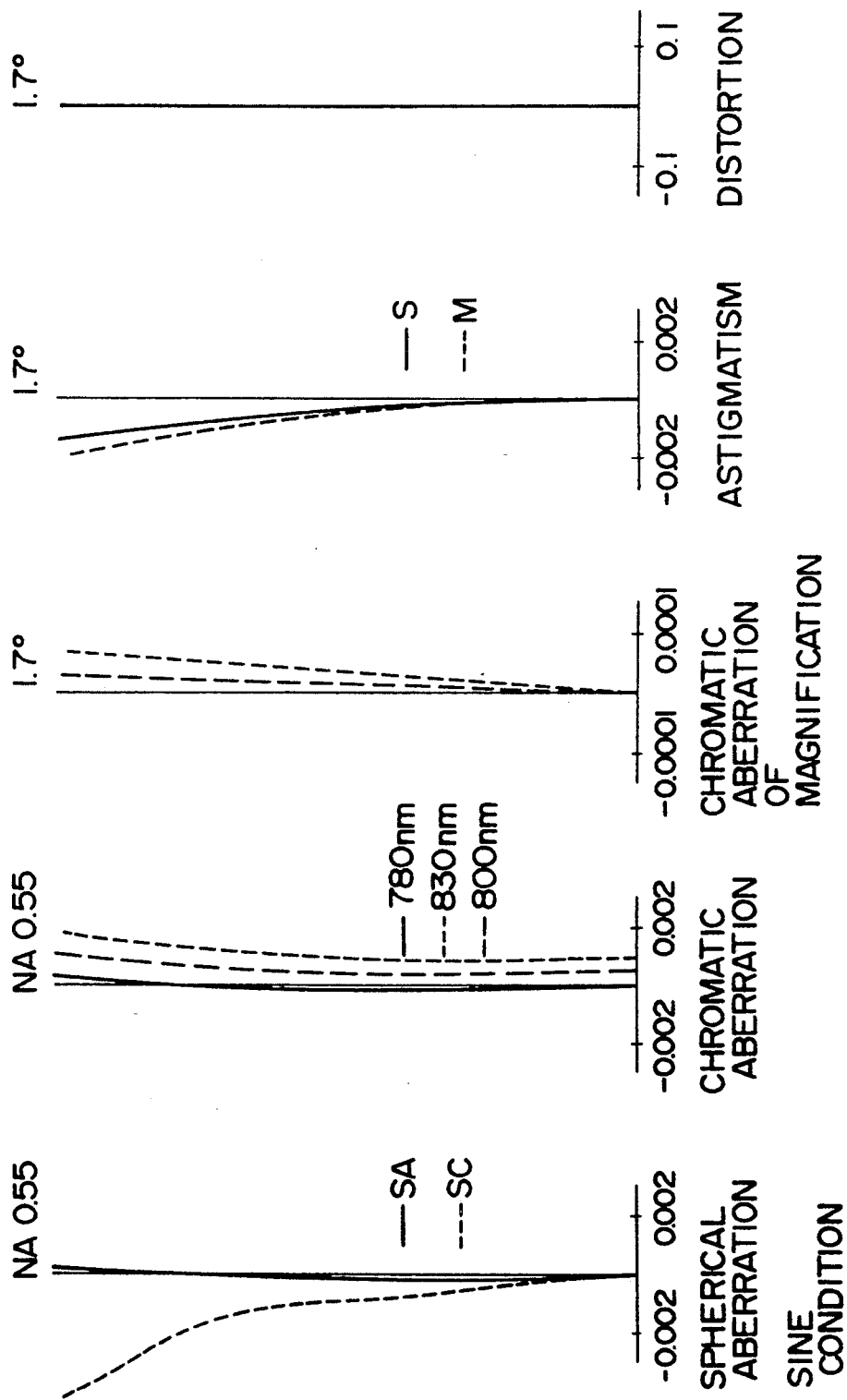
FIG. 21 are various aberration diagrams of the objective lens system shown in FIG. 20.
Figure 23:
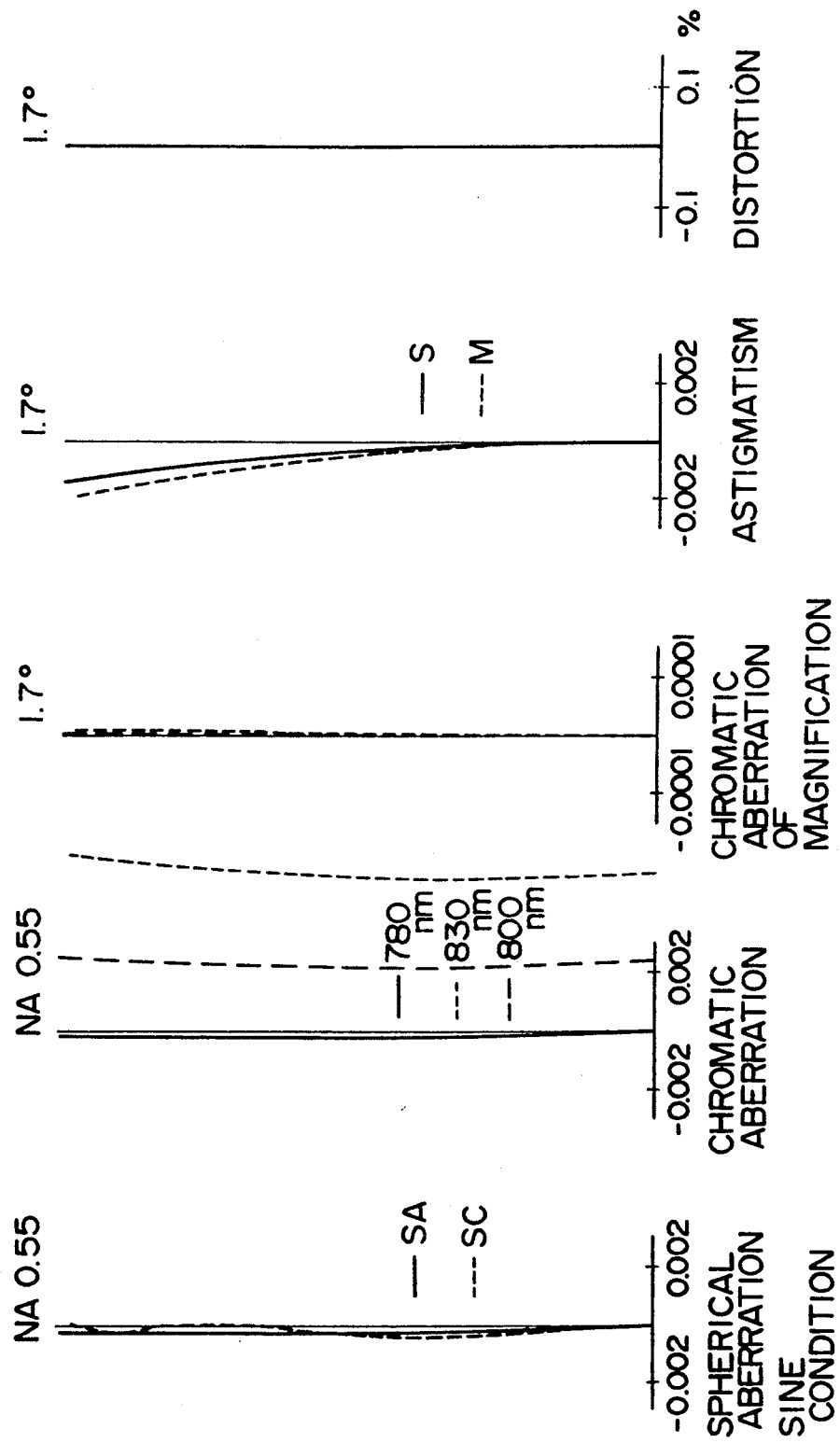
FIG. 23 are various aberration diagrams of a single unit of the converging lens shown in FIG. 20.

FIG. 20 shows EXAMPLE 7 of the objective lens system and concrete numerical values of construction are shown in TABLE 14. The aspherical coefficients of the converging lens are shown in TABLE 15. Various aberrations of this objective lens system are shown in FIG. 21 and the wave aberrations are shown in FIG. 22. Also, in order to determine the effect of the chromatic aberration correcting element, various aberrations and the wave aberrations by a single unit of the converging lens are shown in FIGS. 23 and 24.

TABLE 14

NA = 0.55 f = 3.31 ω = 1.7° wd = 1.40

| surface NO. | r | d | $n_{780}$ | $\nu_{780}$ | glass material name |
|---|---|---|---|---|---|
| 1 | ∞ | 1.50 | 1.82195 | 875 | LaSF05 |
| 2 | −3.000 | 0.70 | 1.82484 | 553 | SFL03 |
| 3 | ∞ | 0.20 | | | |
| 4 | 2.005 | 2.080 | 1.48479 | 1461 | |
| 5 | −5.231 | | | | |

TABLE 15

| 4th surface | 5th surface |
|---|---|
| K = −0.5223E + 00 | K = −0.3168E + 01 |
| A4 = −0.1400E − 03 | A4 = 0.1740E − 01 |
| A6 = −0.4966E − 04 | A6 = −0.4011E − 02 |
| A8 = 0.1654E − 04 | A8 = 0.5593E − 03 |
| A10 = −0.1292E − 04 | A10 = −0.3494E − 04 |
| A12 = 0.0000E + 00 | A12 = 0.0000E + 00 |

EXAMPLE 8

Figure 25:
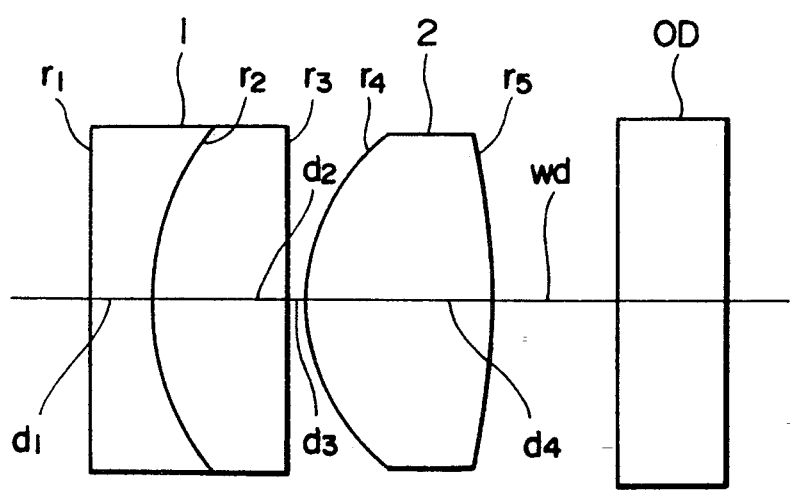
FIG. 25 is a lens diagram showing EXAMPLE 8 of an objective lens system according to the present invention.

FIG. 25 shows EXAMPLE 8 of the objective lens system and concrete numerical values of construction are shown in Table 16. The converging lens is the same to that of EXAMPLE 7.

Figure 26:
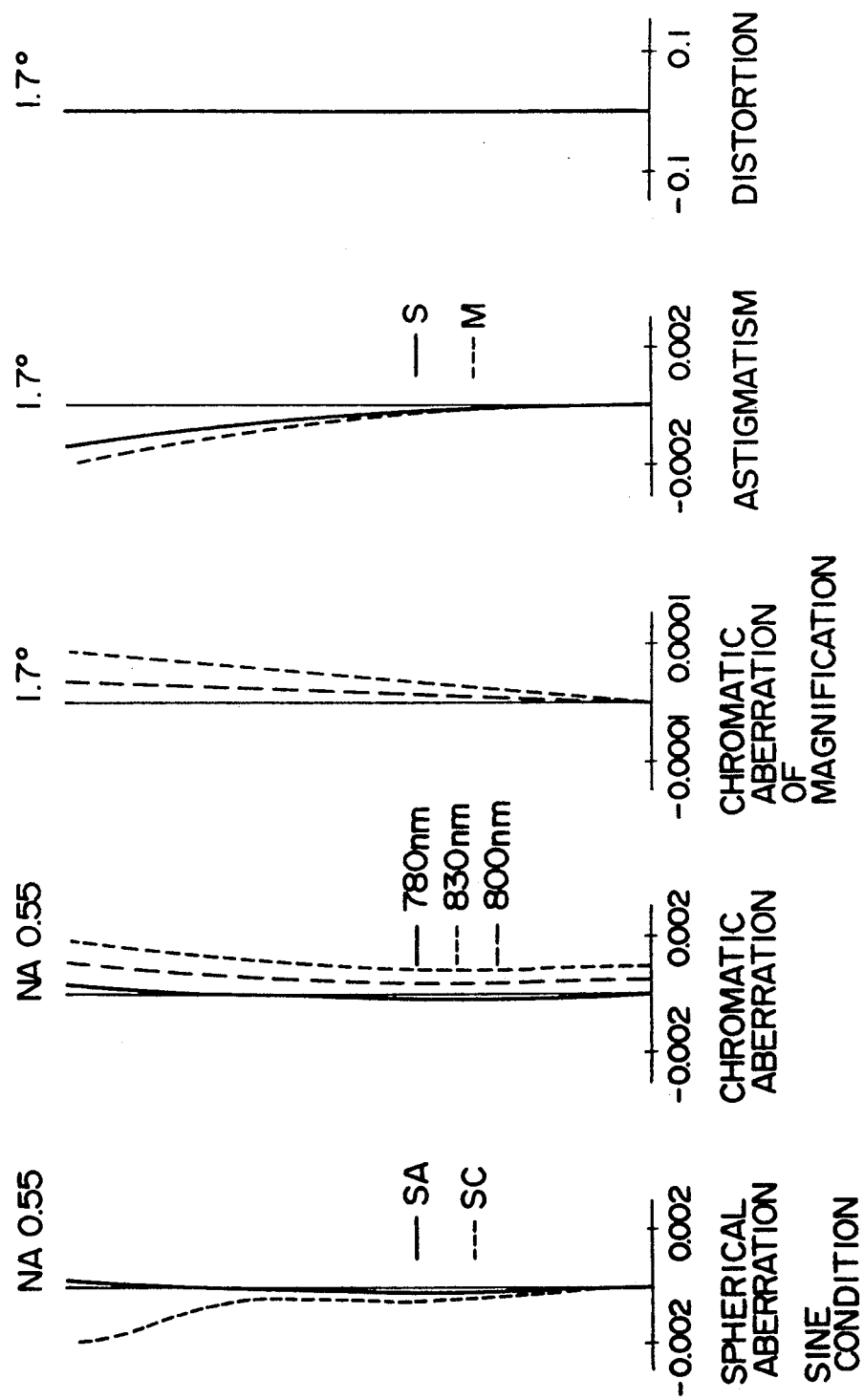
FIG. 26 are various aberration diagrams of the objective lens system shown in FIG. 25.

Various aberrations of this objective lens system are shown in FIG. 26 and the wave aberrations are shown in FIG. 27.

TABLE 16

NA = 0.55 f = 3.31 ω = 1.7° wd = 1.40

| surface NO. | r | d | $n_{780}$ | $\nu_{780}$ | glass material name |
|---|---|---|---|---|---|
| 1 | ∞ | 0.70 | 1.82484 | 553 | SFL03 |
| 2 | 3.000 | 1.50 | 1.82195 | 875 | LaSF05 |
| 3 | ∞ | 0.20 | | | |
| 4 | 2.005 | 2.080 | 1.48479 | 1461 | |
| 5 | −5.231 | | | | |

EXAMPLE 9

Figure 28:
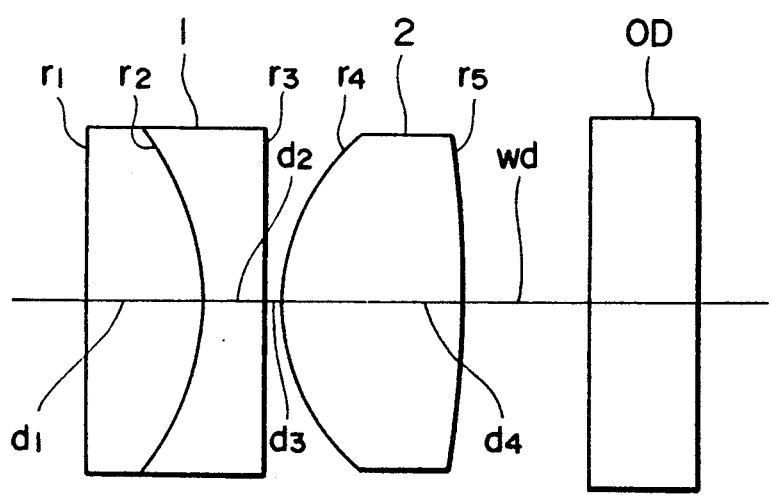
FIG. 28 is a lens diagram showing EXAMPLE 9 of an objective lens system according to the present invention.

FIG. 28 shows EXAMPLE 9 of the objective lens system and concrete numerical values of construction are shown in TABLE 17. The aspherical coefficients of the converging lens are shown in TABLE 18.

TABLE 17

NA = 0.55 f = 3.31 ω = 1.7° wd = 1.42

| surface NO. | r | d | $n_{780}$ | $\nu_{780}$ | glass material name |
|---|---|---|---|---|---|
| 1 | ∞ | 1.30 | 1.82195 | 875 | LaSF05 |
| 2 | −2.900 | 0.70 | 1.82484 | 553 | SFL03 |
| 3 | ∞ | 0.20 | | | |
| 4 | 2.116 | 2.00 | 1.53670 | 1507 | |
| 5 | −7.278 | | | | |

TABLE 18

| 4th surface | 5th surface |
|---|---|
| K = −0.5086E + 00 | K = −0.9722E + 00 |
| A4 = 0.5580E − 04 | A4 = 0.1344E − 01 |
| A6 = −0.1938E − 04 | A6 = −0.2130E − 02 |
| A8 = 0.3046E − 04 | A8 = 0.1502E − 03 |
| A10 = −0.1039E − 04 | A10 = 0.2659E − 05 |
| A12 = 0.0000E + 00 | A12 = 0.0000E + 00 |

Figure 29:
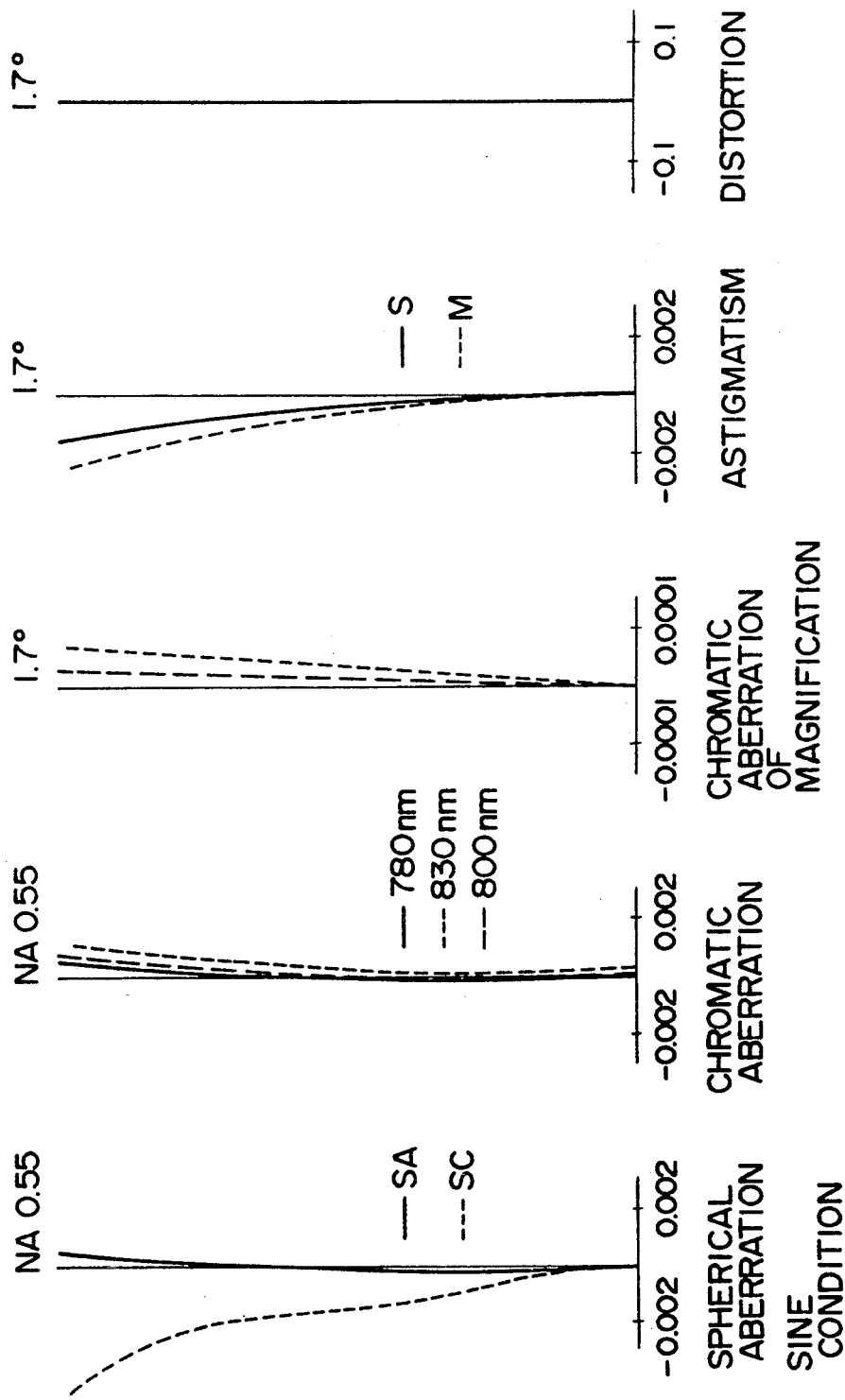
FIG. 29 are various aberration diagrams of the objective lens system shown in FIG. 28.

Various aberrations of this objective lens system are shown in FIG. 29 and the wave aberrations are shown in FIG. 30. Also, in order to determine the effect of the chromatic aberration correcting element, various aberrations and the wave aberrations by a single unit of the converging lens are shown in FIGS. 31 and 32.

EXAMPLE 10

Figure 33:
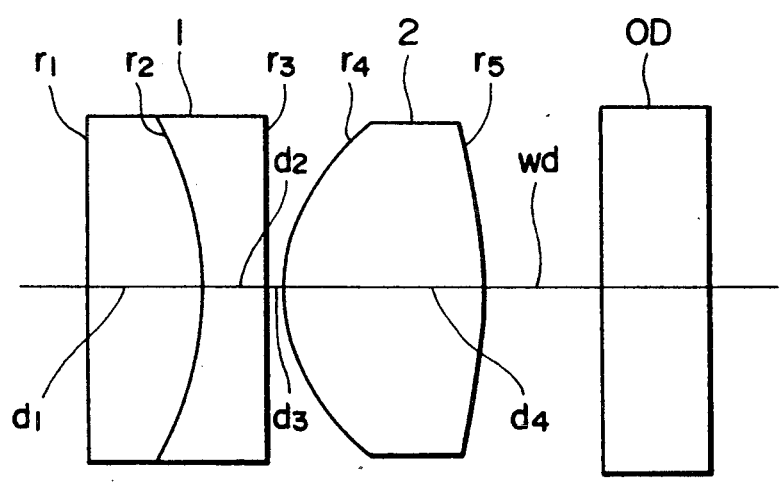
FIG. 33 is a lens diagram showing EXAMPLE 10 of an objective lens system according to the present invention.
Figure 34:
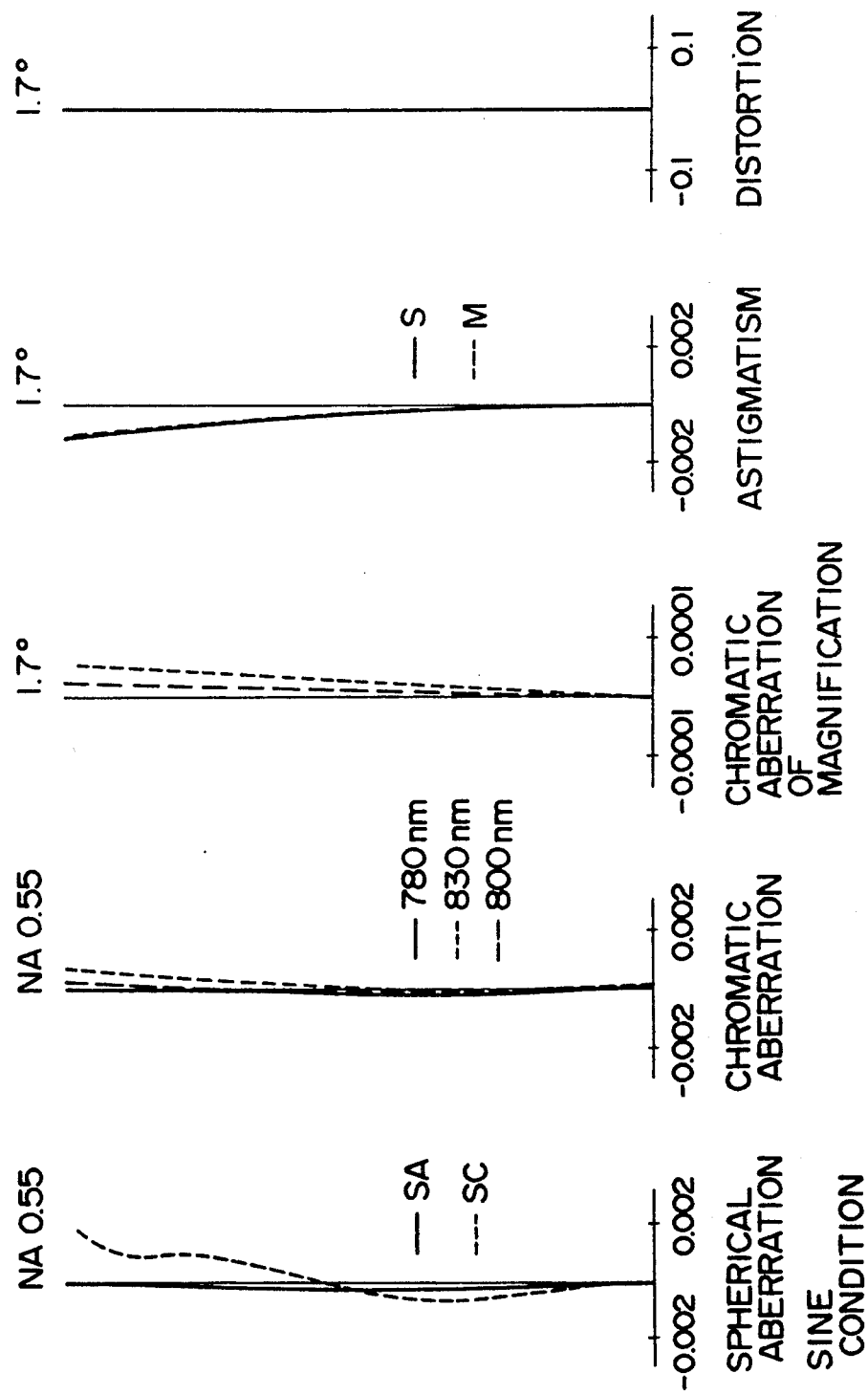
FIG. 34 are various aberration diagrams of the objective lens system shown in FIG. 33.
Figure 36:
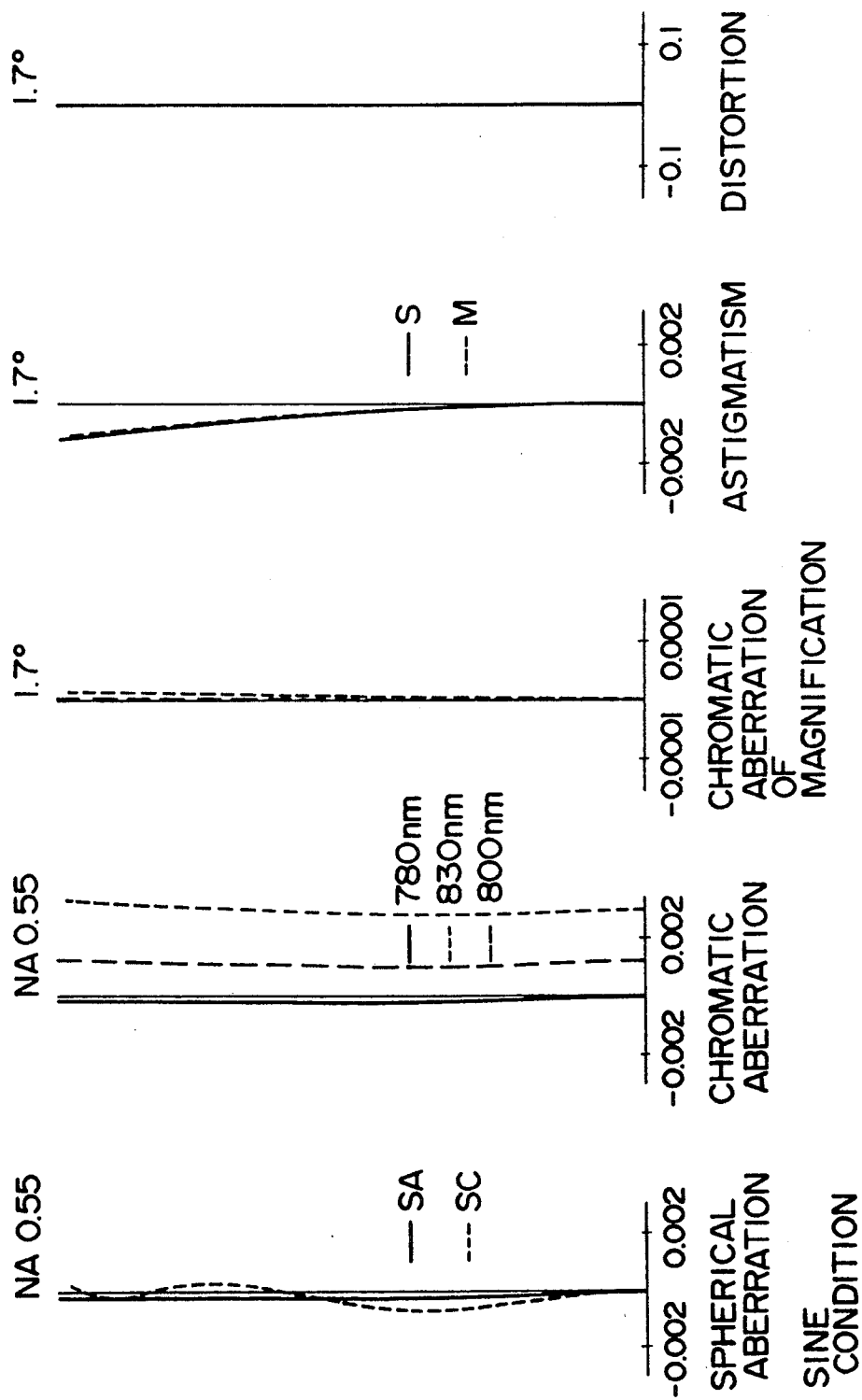
FIG. 36 are various aberration diagrams of a single unit of the converging lens shown in FIG. 33.

FIG. 33 shows EXAMPLE 10 of the objective lens system, with concrete numerical values of construction are shown in TABLE 19 and the coefficients of the aspherical surface of the converging lens are shown in TABLE 20. Various aberrations of this objective lens system are shown in FIG. 34 and the wave aberrations are shown in FIG. 35. Also, in order to determine the effect of the chromatic aberration correcting element, various aberrations and the wave aberrations by a single unit of the converging lens are shown in FIGS. 36 and 37.

TABLE 19

NA = 0.55 f = 3.30 ω = 1.7° wd = 1.32

| surface NO. | r | d | $n_{780}$ | $\nu_{780}$ | glass material name |
|---|---|---|---|---|---|
| 1 | ∞ | 1.30 | 1.78705 | 880 | LaSF02 |
| 2 | −3.600 | 0.70 | 1.78565 | 601 | SFL6 |
| 3 | ∞ | 0.20 | | | |
| 4 | 1.883 | 2.24 | 1.43107 | 1461 | |
| 5 | −3.732 | | | | |

TABLE 20

| 4th surface | 5th surface |
|---|---|
| K = −0.5627E + 00 | K = −0.4708E + 01 |
| A4 = −0.1402E − 03 | A4 = 0.2011E − 01 |
| A6 = −0.6290E − 04 | A6 = −0.5946E − 02 |
| A8 = 0.4537E − 04 | A8 = 0.9448E − 03 |
| A10 = −0.2548E − 04 | A10 = −0.6470E − 04 |
| A12 = 0.0000E + 00 | A12 = 0.0000E + 00 |

A relation between above-mentioned examples and conditional expressions are shown in table 21 and 22.

TABLE 21

| | EX. 1 | EX. 2 | EX. 3 | EX. 4 | EX. 5 |
|---|---|---|---|---|---|
| (1) | 0.0878 | 0.1242 | 0.0599 | 0.0451 | 0.0062 |
| (2) | 0.834 | 0.922 | 0.945 | 0.727 | 1.176 |
| (3) | 601 | 601 | 601 | 601 | 601 |
| (4) | 1454 | 1136 | 1454 | 1454 | 1454 |
| (5) | 1.61139 | 1.68442 | 1.61139 | 1.61139 | 1.61139 |
| (6) | 17436 | 10123 | 17426 | 17426 | 17426 |
| (7) | 0.359 | 0.322 | 0.359 | 0.359 | 0.359 |
| (8) | 3.13 | 17.9 | 3.58 | 3.64 | 2.31 |
| (9) | 8.22 | 4.03 | 11.6 | 9.79 | 1.51 |

TABLE 22

| | EX. 6 | EX. 7 | EX. 8 | EX. 9 | EX. 10 |
|---|---|---|---|---|---|
| (1) | 0.00247 | 0.00319 | 0.00319 | 0.00330 | 0.00128 |
| (2) | 0.855 | 0.906 | 0.906 | 0.876 | 1.090 |
| (3) | 553 | 553 | 553 | 601 | 553 |
| (4) | 875 | 875 | 875 | 875 | 880 |
| (5) | 1.82195 | 1.82195 | 1.82195 | 1.82195 | 1.78705 |
| (6) | 289 | 289 | 289 | 289 | 140 |
| (7) | 0.302 | 0.302 | 0.302 | 0.302 | 0.250 |
| (8) | 15.2 | ∞ | ∞ | ∞ | ∞ |
| (9) | 15.2 | ∞ | ∞ | ∞ | ∞ |

Figure 38:
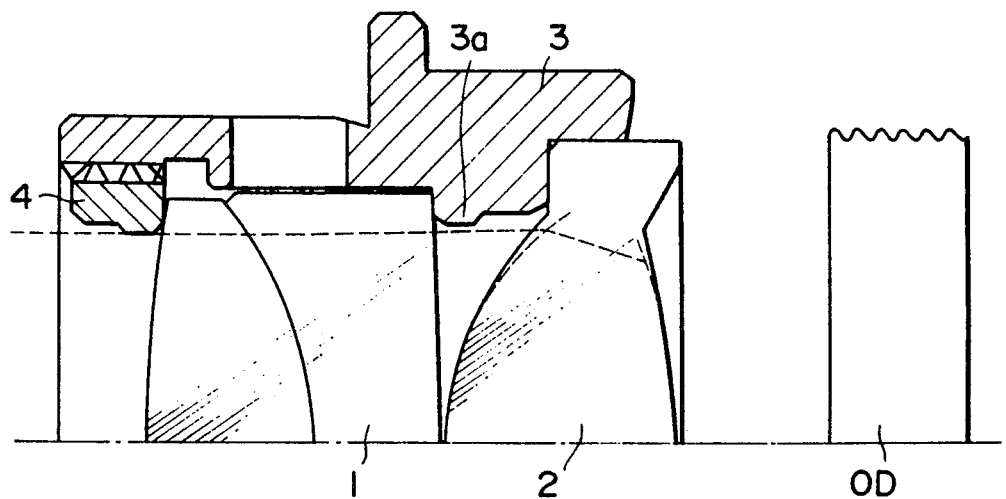
FIG. 38 is a sectional diagram showing one example of lens barrel in which an objective lens system is mounted.

FIG. 38 shows one example of the assembly of above-mentioned objective lens system in a lens barrel. In the lens barrel 3, an inner flange 3a is formed. The chromatic aberration correcting element 1 is butted into the inner flange 3a from a left side in figure and fixed by a ring nut 4.

In other hand, the converging lens 2 is inserted in the lens barrel 3 from right side in the figure, and is positioned by butting into the inner flange 3a.

Figure 39:
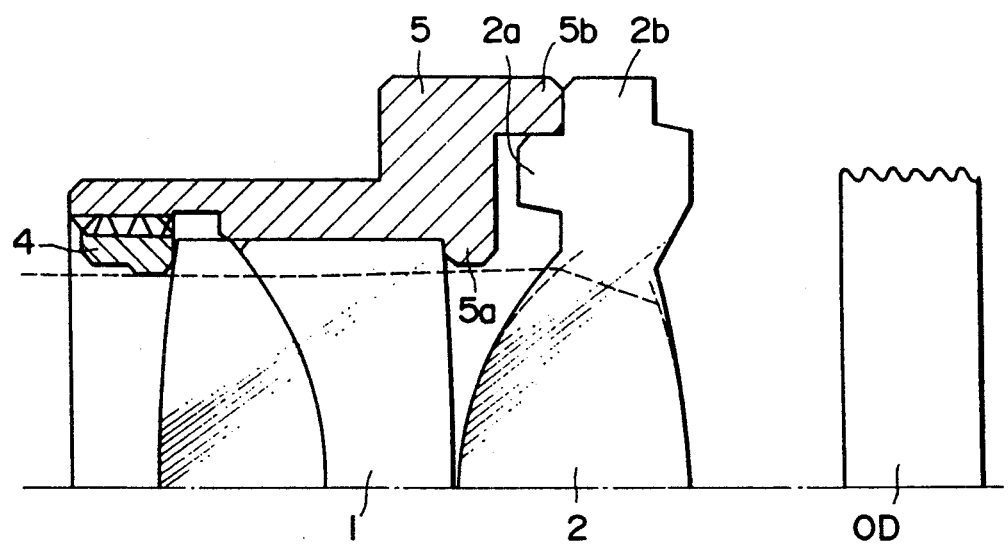
FIG. 39 is a sectional diagram showing other example of lens barrel in which an objective lens system is mounted.
Figure 40:
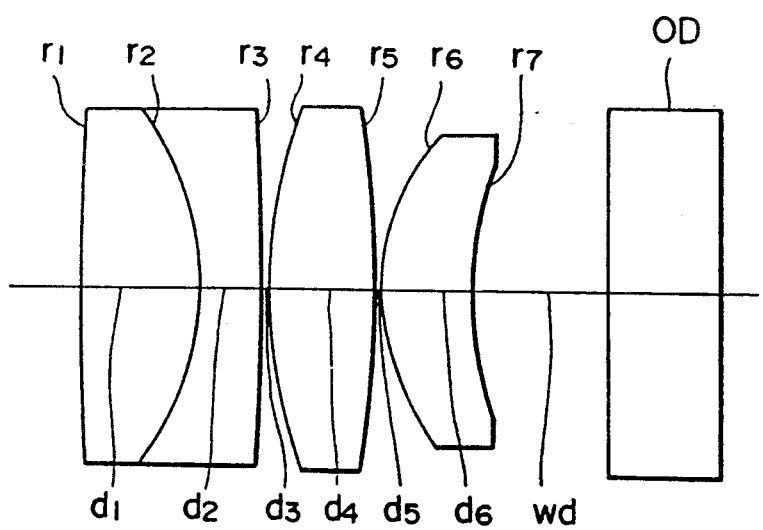
FIG. 40 is a lens diagram showing prior art of an objective lens system.
Figure 41:
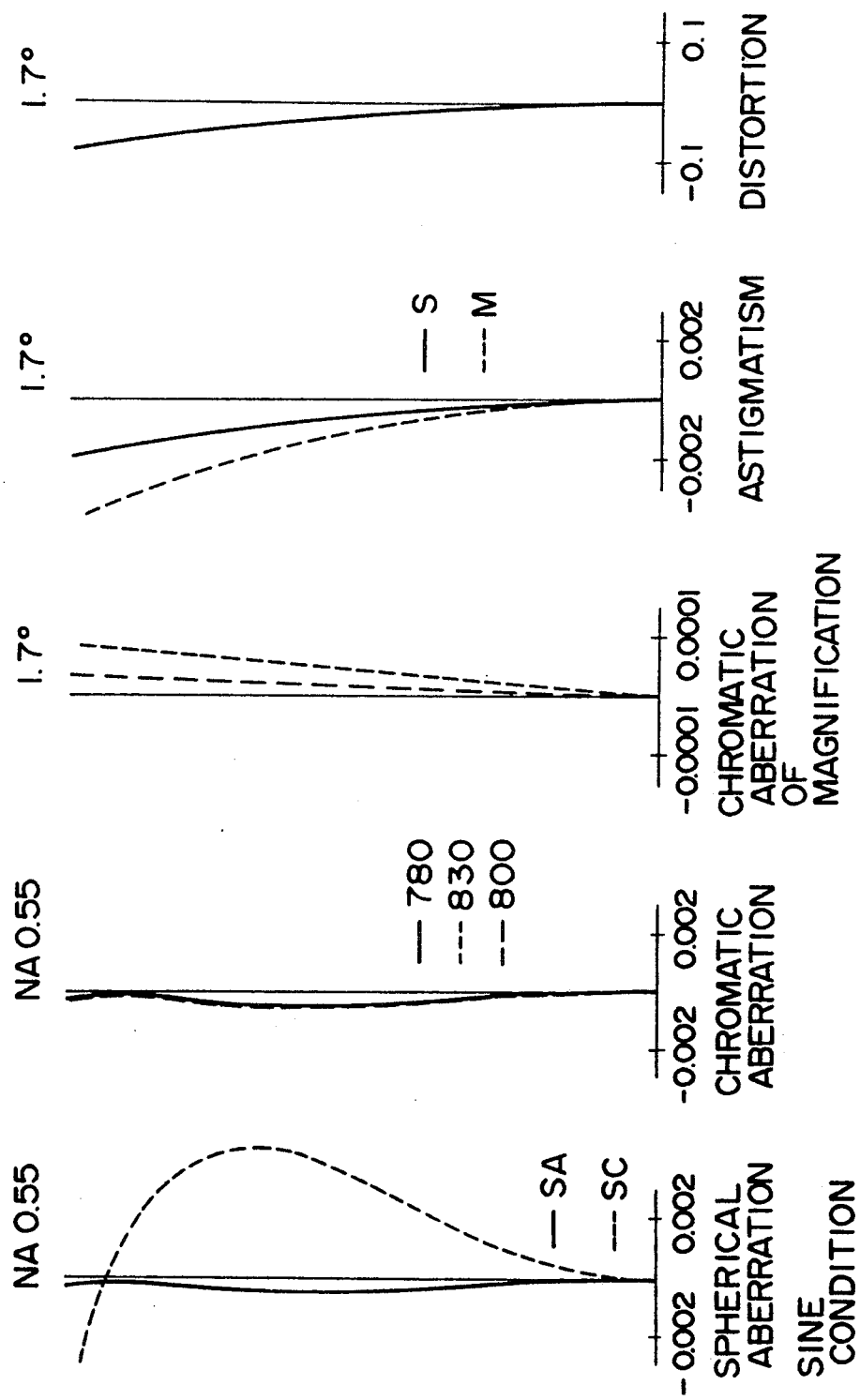
FIG. 41 are various aberration diagrams of the objective lens system shown in FIG. 40.

FIG. 39 shows another example of the assembly of the objective lens system. In this example, the chromatic aberration correcting element 1 is butted into the inner flange 5a from left side in the figure, and fixed by the ring nut 4, same as above explained example.

The converging lens 2 has a rib 2a which is projected along the optical axis direction and an edge portion 2b which is projected to the outer direction. In this case, the converging lens 2 is made of plastic, and this lens is formed integral with the rib 2a and the edge portion 2b. Moreover, it is possible that the converging lens 2 is formed integral with the lens barrel 5.

What is claimed is:

1. An objective lens of an optical information recording/reproducing apparatus, said objective lens comprising:

a converging lens for converging a luminous flux emitted from a light source onto a medium, and having both surfaces formed as convex aspherical surfaces and having a radius of curvature which increases as it goes towards the periphery from the center thereof, said radius of curvature being disposed such that a smaller radius surface thereof faces towards a light source side; and a chromatic aberration correcting element having a small refractive power that is disposed towards said light source side of said converging lens and which is adapted to correct a chromatic aberration of said converging lens, said chromatic aberration correcting element being constructed of positive and negative lenses that are cemented to each other, wherein said objective lens satisfies a relation:

$$|f/f_c| < 0.20,$$

wherein a focal length of said objective lens is represented by f, and a focal length of said chromatic aberration correcting element is represented by $f_c$.

2. The objective lens of an optical information recording/reproducing apparatus of claim 1, wherein said objective lens satisfies the following relation;

$$|f/f_c| < 0.01.$$

3. The objective lens of an optical information recording/reproducing apparatus of claim 1, wherein said objective lens satisfies the following relation;

$$|r_2/f| > 0.70$$

wherein a radius of the curvature of cemented surface is represented by $r_2$.

4. The objective lens of an optical information recording/reproducing apparatus of claim 1, wherein said chromatic aberration correcting element satisfies the following relation;

$$\nu_{n780} < 700$$

$$\nu_{p780} > 800$$

$$n_{p780} > 1.55$$

wherein;

$n_{n780}$, $n_{n830}$: refractive index of a negative lens in wavelengths of 780 nm and 830 nm $n_{p780}$, $n_{p830}$: refractive index of a positive lens in wavelengths of 780 nm and 830 nm $\nu_{n780}$: dispersion of a negative lens in the vicinity of a wavelength of 780 nm wherein;

$\nu_{n780} = n_{n780}/(n_{n780} - n_{n830})$ $\nu_{p780}$: dispersion of a positive lens in the vicinity of a wavelength of 780 nm wherein;

$\nu_{p780} = n_{p780}/(n_{p780} - n_{p830})$.

5. The objective lens of an optical information recording/reproducing apparatus of claim 1, wherein said chromatic aberration correcting element satisfies the following relation;

$$|n_{p780} - n_{n780}| \times 10^5 < 20{,}000.$$

wherein the refractive index of the positive lens is represented by $n_{p780}$, and the refractive index of the negative lens by $n_{n780}$.

6. The objective lens of an optical information recording/reproducing apparatus of claim 1, wherein said chromatic aberration correcting element satisfies the following relation;

$$|n_{p780} - n_{n780}| \times 10^5 < 1000$$

wherein the refractive index of the positive lens is represented by $n_{p780}$, and the refractive index of the negative lens by $n_{n780}$.

7. The objective lens of an optical information recording/reproducing apparatus of claim 1, wherein said chromatic aberration correcting element satisfies the following relation;

$$(n_{p780} - 1)(1 - \nu_{n780}/\nu_{p780}) > 0.2$$

wherein;

$n_{n780}$, $n_{n830}$: refractive index of a negative lens in wavelengths of 780 nm and 830 nm $n_{p780}$, $n_{p830}$: refractive index of a positive lens in wavelengths of 780 nm and 830 nm $\nu_{n780}$: dispersion of a negative lens in the vicinity of a wavelength of 780 nm wherein;

$\nu_{n780} = n_{n780}/(n_{n780} - n_{n830})$ $\nu_{p780}$: dispersion of a positive lens in the vicinity of a wavelength of 780 nm wherein;

$\nu_{p780} = n_{p780}/(n_{p780} - n_{p830})$.

8. The objective lens of an optical information recording/reproducing apparatus of claim 1, wherein said chromatic aberration correcting element satisfies the following relations;

$$|r_1/f| > 7$$

$$|r_3/f| > 7$$

wherein;

$r_1$: radius of curvature of incident surface the chromatic aberration correcting element $r_3$: radius of curvature of outgoing surface the chromatic aberration correcting element.

9. The objective lens of claim 1, wherein said chromatic aberration correcting element is positioned adjacent to said converging lens.

10. The objective lens according to claim 1, wherein said converging lens and said chromatic aberration correcting element are mounted for movement.

11. The objective lens according to claim 10, wherein said converging lens and said chromatic aberration correcting element are mounted for movement together.

12. The objective lens according to claim 1, wherein said chromatic aberration element and said converging lens are fixedly positioned with respect to each other.

13. An objective lens of an optical information recording/reproducing apparatus, said objective lens comprising:
   a converging lens that converges a luminous flux that is emitted from a light source onto a medium, said converging lens having convex aspherical surfaces and a radius of curvature that increases from a center of said converging lens to a periphery thereof, said radius of curvature being disposed such that a smaller radius surface thereof faces towards a light source side; and
   a chromatic aberration correcting element having a small refractive power that is disposed towards said light source side of said converging lens and is adapted to correct a chromatic aberration of said converging lens, said chromatic aberration correcting element being constructed of a positive lens and a negative lens that are cemented to each other, wherein said converging lens provides essentially all of a magnifying power of said objective lens with essentially no correction of any chromatic aberration, while said chromatic aberration correcting element corrects any chromatic aberration with essentially no magnification power.

14. The objective lens of claim 13, wherein a following equation is satisfied:

$$|f/f_c| < 0.01,$$

where f represents a focal length of said objective lens, and $f_c$ represents a focal length of said chromatic aberration correcting element.

15. The objective lens of claim 13, wherein a following equation is satisfied:

$$|r_2/f| > 0.70,$$

where f represents a focal length of said objective lens, and $r_2$ represents a radius of curvature of a cemented surface.

16. The objective lens of claim 13, wherein said chromatic aberration correcting element satisfies the following equations:

$$\nu_{n780} < 700,$$

$$\nu_{p780} > 800,$$

and $$n_{p780} > 1.55,$$

where:
$\nu_{n780}$ represents a dispersion of said negative lens in the vicinity of a wavelength of 780 nm, $\nu_{n780}$ being equal to $n_{n780}/(n_{n780} - n_{n830})$;

$\nu_{p780}$ represents a dispersion of said positive lens in the vicinity of a wavelength of 780 nm, $\nu_{p780}$ being equal to $n_{p780}/(n_{p780} - n_{p830})$;

$n_{n780}$ and $n_{n830}$ represent a refractive index of said negative lens at a wavelength of 780 nm and 830 nm, respectively; and $n_{p780}$ and $n_{p830}$ represent a refractive index of said positive lens at a wavelength of 780 nm and 830 nm, respectively.

17. The objective lens of claim 13, wherein said chromatic aberration correcting element satisfies an equation:

$$|n_{p780} - n_{n780}| \times 10^5 < 20,000,$$

where $n_{p780}$ represents a refractive index of said positive lens, and $n_{n780}$ represents a refractive index of said negative lens.

18. The objective lens of claim 13, wherein said chromatic aberration correcting element satisfies an equation:

$$|n_{p780} - n_{n780}| \times 10^5 < 1000,$$

where $n_{p780}$ represents a refractive index of said positive lens, and $n_{n780}$ represents a refractive index of said negative lens.

19. The objective lens of claim 13, wherein said chromatic aberration correcting element satisfies an equation:

$$(n_{p780} - 1)(1 - \nu_{n780}/\nu_{p780}) > 0.2,$$

where:
$\nu_{n780}$ represents a dispersion of said negative lens in the vicinity of a wavelength of 780 nm, $\nu_{n780}$ being equal to $n_{n780}/(n_{n780} - n_{n830})$;

$\nu_{p780}$ represents a dispersion of said positive lens in the vicinity of a wavelength of 780 nm, $\nu_{p780}$ being equal to $n_{p780}/(n_{p780} - n_{p830})$;

$n_{n780}$ and $n_{n830}$ represent a refractive index of said negative lens at a wavelength of 780 nm and 830 nm, respectively; and $n_{p780}$ and $n_{p830}$ represent a refractive index of said positive lens at a wavelength of 780 nm and 830 nm, respectively.

20. The objective lens of claim 13, wherein said chromatic aberration correcting element satisfies the following relations:

$$|r_1/f| > 7;$$

and $$|r_3/f| > 7,$$

where $r_1$ represents a radius of curvature of an incident surface of said chromatic aberration correcting element, $r_3$ represents a radius of curvature of an outgoing surface of said chromatic aberration correcting element, and f represents a focal length of said objective lens.

* * * * *